United States Patent
Lee et al.

(10) Patent No.: US 9,870,775 B2
(45) Date of Patent: Jan. 16, 2018

(54) METHOD AND DEVICE FOR VOICE RECOGNITION AND ELECTRONIC DEVICE THEREOF

(71) Applicant: Samsung Electronics Co., Ltd., Gyeonggi-do (KR)

(72) Inventors: Namil Lee, Gyeonggi-do (KR); Jongmo Kum, Seoul (KR); Gangyoul Kim, Gyeonggi-so (KR); Ho-Chul Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 16 days.

(21) Appl. No.: 15/006,226

(22) Filed: Jan. 26, 2016

(65) Prior Publication Data

US 2016/0217789 A1 Jul. 28, 2016

(30) Foreign Application Priority Data

Jan. 26, 2015 (KR) .................. 10-2015-0012203

(51) Int. Cl.
| | |
|---|---|
| *G10L 15/06* | (2013.01) |
| *G10L 15/00* | (2013.01) |
| *H04R 9/06* | (2006.01) |
| *G10L 15/32* | (2013.01) |
| *H04R 1/40* | (2006.01) |
| *G10L 21/0216* | (2013.01) |

(52) U.S. Cl.
CPC .... *G10L 15/32* (2013.01); *G10L 2021/02166* (2013.01); *H04R 1/406* (2013.01); *H04R 2430/21* (2013.01)

(58) Field of Classification Search
CPC ....................................................... G10L 15/20
USPC ......................................................... 704/244
See application file for complete search history.

(56) References Cited

U.S. PATENT DOCUMENTS

| | | | |
|---|---|---|---|
| 2003/0177006 A1* | 9/2003 | Ichikawa | ............ G10L 21/0216 704/231 |
| 2007/0033020 A1 | 2/2007 | Francois et al. | |
| 2007/0127753 A1 | 6/2007 | Feng et al. | |
| 2010/0002899 A1* | 1/2010 | Tamaru | .................. H04M 1/02 381/335 |

(Continued)

FOREIGN PATENT DOCUMENTS

KR 10-0827080 B1 5/2008

*Primary Examiner* — Paras D Shah
*Assistant Examiner* — Timothy Nguyen
(74) *Attorney, Agent, or Firm* — Cha & Reiter, LLC

(57) ABSTRACT

The present disclosure relates to an electronic device and a method for operating same, which can divide a recognition section for voice recognition, process different types of voice recognition corresponding to the divided recognition sections, and improve a voice recognition rate. According to an embodiment, a method for recognizing a voice by an electronic device may include: detecting a voice input; determining the direction of the voice and a beamforming direction. Voice recognition is based on the voice when the direction of the voice and the beamforming direction correspond to each other. Different types of voice recognition may be performed for voices input in a first section and a second section, based on divided types of voice input sections, when the direction of the voice and the beamforming direction do not correspond to each other.

20 Claims, 11 Drawing Sheets

(56) References Cited

U.S. PATENT DOCUMENTS

2014/0278394 A1* 9/2014 Bastyr ................ G10L 21/0208
704/233

* cited by examiner

METHOD AND DEVICE FOR VOICE RECOGNITION AND ELECTRONIC DEVICE THEREOF

CLAIM OF PRIORITY

This application claims the benefit of priority under 35 U.S.C. §119(a) to Korean Application Serial No. 10-2015-0012203, which was filed in the Korean Intellectual Property Office on Jan. 26, 2015, the entire content of which is hereby incorporated by reference.

BACKGROUND

Field of the Disclosure

The present disclosure relates to a voice recognition method and a device thereof that improves a voice recognition performance in an electronic device.

Description of the Related Art

In general, various types of electronic devices such as a smart phone, or a tablet PC, etc. may include various voice interfaces capable of recognizing a user's voice and easily performing an operation desired by the user.

Voice interfaces are well-known and have been in widespread use as part of voice recognition technology, which convert the voice signal of the user input through a microphone of the electronic device into an electrical signal, and then analyzes the converted electrical signal, so as to recognize the user's voice as a command or a text.

Conventional voice recognition technology has performed voice recognition after receiving the input of a speaker's voice from a beginning to an end of the process. In recent years, a voice recognition function has been developed to which beamforming is applied in order to fulfill a growing need for multi-directional simultaneous voice recognition.

In general, for the voice recognition operations to which beamforming is applied, there is a problem that in a case where the beam formed direction is not toward the speaker, the user's voice may not be exactly input during a predetermined time (e.g., tracking time) (for example, 0.3 seconds) consumed for tracking the user's direction (position). For example, during a predetermined time, a first syllable of the voice may not be correctly input, or the syllable is cut-off and is then input to a voice recognition device of an electronic device. Therefore, the electronic device may not correctly receive the user's voice (for example, miss all or part of the first syllable) and thus there is a problem that the voice recognition rate decreases, causing user dissatisfaction. In addition, while the general voice recognition performs training using pre-modeled voices, the beamforming-applied voice recognition does not perform the training, so there is a problem regarding a reduced voice recognition rate of a voice input through the beamforming-applied recognition.

SUMMARY

Various embodiments of the present disclosure may provide an electronic device and a method for voice recognition utilizing beamforming-applied recognition, which can reduce the failure rate of voice recognition failures that occur when a voice that is input during a predetermined time required to change the beamforming-applied direction to correspond to the user's (e.g., speaker's) direction (position).

Various embodiments of the present disclosure may provide an electronic device and a method for voice recognition, which can divide a voice recognition section (i.e. a voice recognition dictionary, which may have been defined previously for one or more speakers, or may be non-specific, and a specific or customized speaker voice recognition dictionary) into a first section and a second section, process different types of voice recognition for each of the divided sections, and thereby improve the voice recognition rate.

Various embodiments of the present disclosure may provide an electronic device and a method for voice recognition, wherein, when a beamforming direction of the electronic device is different from the direction of the input voice, the electronic device and method thereof can process voice recognition by dividing the voice signal into a voice signal which is input in a first section (for example, a section prior to complete beam formation (e.g., a beam forming section, a direction recognition section) in which a change is performed so as to correspond the beamforming direction to the direction of the input voice, and a voice signal which is input in a second section after the change of the beamforming direction has been completed (for example, a section after the first section (e.g., a section after the beam has been formed, or a normal recognition section)).

Various embodiments of the present disclosure may provide an electronic device and a method for voice recognition, which can implement an optimal environment for supporting the voice recognition by an electronic device to improve the user's convenience and the usability of the electronic device.

According to various embodiments of the present disclosure, there is provided an electronic device providing voice recognition that includes: a microphone that receives an input of a voice; a non-transitory storage that stores data processed based on voice recognition; and a processor functionally connected to the microphone and the storage unit, wherein the processor includes circuitry configured to divide a voice recognition section for voice recognition into a first section and a second section, and perform different types of voice recognition for voices input in the first section and the second section, based on types of the divided voice recognition sections.

According to various embodiments of the present disclosure, there is provided a method for operating voice recognition in an electronic device. The method may include: detecting, by the electronic device, a voice input; determining the direction of the voice and a beamforming direction; performing voice recognition on the basis of the voice when the direction of the voice and the beamforming direction correspond to each other; and performing different types of voice recognition for voices input in a first section and a second section based on divided types of voice input sections, when the direction of the voice and the beamforming direction do not correspond to each other.

According to various embodiments of the present disclosure, there is provided a computer-readable recording medium in which a program for executing voice recognition is recorded, comprising: dividing a voice recognition section for recognizing a voice into a first section and a second section; and processing different types of voice recognition for the voice input in the first section and the voice input in the second section.

BRIEF DESCRIPTION OF THE DRAWINGS

The above and other aspects, features, and advantages of the present disclosure will become more apparent to a person of ordinary skill in the art from the following detailed description taken in conjunction with the accompanying drawings, in which.

DETAILED DESCRIPTION

Figure 1:
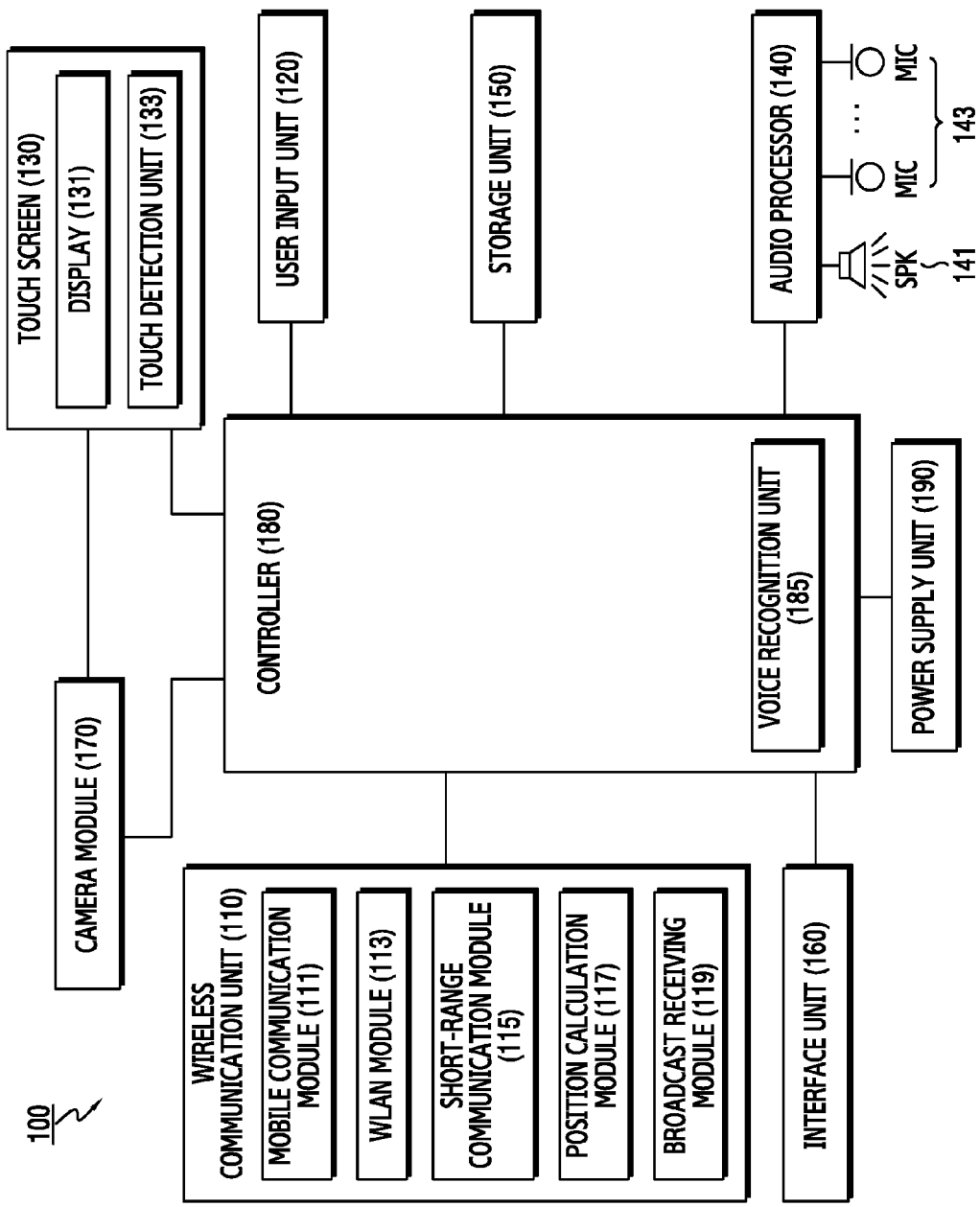
FIG. 1 is a schematic block diagram of an electronic device according to an embodiment of the present disclosure.

Hereinafter, various embodiments of the present disclosure will be described with reference to the accompanying drawings. However, a person of ordinary skill in the art should understand that there is no intent to limit the present disclosure including the appended claims to the particular forms shown and described herein; rather, the present disclosure should be construed to cover various modifications, equivalents, and/or alternatives of embodiments of the present disclosure. In describing the drawings, similar reference numerals may be used to designate similar constituent elements.

The proposed disclosure relates to an electronic device including a voice recognition function, and a method for operating the same. Various embodiments of the present disclosure propose an electronic device and a method for dividing a recognition section for voice recognition in different ways, and process different types of voice recognition in response to the divided recognition sections, thereby improving a voice recognition rate.

According to various embodiments of the present disclosure, the electronic device may include one or more microphones, and receive voice signals oriented in multiple directions by applying beamforming. Further, the electronic device may compute the input voice signal based on a configured method and track the occurrence direction of the sound source (the position of the speaker).

According to various embodiments of the present disclosure, the electronic device may process the voice input by differentiating at least one of a speaker, or the position or the direction of the speaker based on one or more microphones. The microphone of the electronic device may be variously manufactured as a single module, etc. on which a number of compact microphones are arranged in a form of an array. According to various embodiments of the present disclosure, the microphone may include an internal microphone which is mounted on an electronic device and an external microphone connected to the electronic device, and be operated by additionally or alternatively combining the internal microphone and the external microphone.

The electronic device according to an embodiment of the present disclosure may use a directional microphone for directing any particular direction, or a non-directional microphone for receiving all directions of the voice signals. In addition, the electronic device may use a microphone as the non-directional or directional microphone.

In various embodiments of the present disclosure, an electronic device may include all devices that use one or more of various processors such as an Application Processor (AP), a Graphic Processing Unit (GPU), and a Central Processing Unit (CPU), such as all the information communication devices, multimedia devices, wearable devices, and application devices therefor which support functions associated with various embodiments of the present disclosure.

In various embodiments of the present disclosure described below, a description will be made with hardware approaches as examples. However, various embodiments of the present disclosure may include a technology that uses both hardware loaded with software, and various embodiments of the present disclosure are not intended to exclude a software-based approach.

FIG. 1 is a schematic block diagram of an electronic device according to an embodiment of the present disclosure.

Referring now to FIG. 1, an electronic device 100 according to various embodiments of the present disclosure may include a wireless communication unit 110, a user input unit 120, a touch screen 130, an audio processor 140, a storage unit 150, an interface unit 160, a camera module 170, a controller 180, and a power supply unit 190. According to various embodiments of the present disclosure, the electronic device 100 may include fewer or more component elements when compared to the component elements of FIG. 1, since the component elements of FIG. 1 are not essential.

The wireless communication unit 110 may include one or more modules which enable wireless communication between the electronic device 100 and a wireless communication system or between the electronic device 100 and another external device (e.g., another electronic device or server). For example, the wireless communication unit 110 is configured to include a mobile communication module 111, a wireless local area network (WLAN) module 113, short-range communication module 115, a position calculation module 117, and a broadcast receiving module 119. The wireless communication module may include or be coupled to one or more of a transmitter, receiver, transceiver, and one or more antennas.

The mobile communication module 111 may transmit/receive a wireless signal to/from at least one of a base station, an external electronic device, and various servers (for example, an integration server, a provider server, a content server, an Internet server, and a cloud server) on a mobile communication network. The wireless signal may include training data, voice call signals, video call signals, or various forms of data according to the transmission and reception of text/multimedia messages.

The mobile communication module 111 may receive one or more data (for example training data, content, messages, mails, images, videos, weather information, location information, or time information, etc.). According to an embodiment of the present disclosure, the mobile communication module 111 may obtain (receive) various pieces of data by being connected with at least one of external devices (e.g., another electronic device or a server) which are connected with the electronic device 100 over a network (e.g., the mobile communication network). The mobile communication module 111 may transmit various pieces of data required for the operation of the electronic device 100 to an external device in response to a user request.

The mobile communication module 111 may perform a communication function. For example, the mobile communication unit 111 may convert a Radio Frequency (RF) signal into a baseband signal under a control of the controller 180, and then provide the converted RF signal to the controller 180, or convert the baseband signal from the controller 180 into the RF signal and then transmit the RF signal. Here, the controller 180 may process the baseband signal based on various communication schemes. For example, the communication method, but not limited thereto, a Global System for Mobile (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTE) communication scheme, an Orthogonal Frequency Division Multiple Access (OFDMA) communication scheme, a Wi-Fi communication scheme, a World interoperability for Microwave Access (WiMax) communication scheme, or a Bluetooth communication scheme.

The WLAN module 113 may be a module for establishing wireless internet access and a WLAN link with other external devices. The wireless LAN module 113 may be internally or externally equipped in the electronic device 100. As the wireless Internet technology, a wireless LAN (Wi-Fi), Wireless broadband (Wibro), WiMax, High Speed Downlink Packet Access (HSDPA), millimeter wave (mmWave), or the like can be utilized.

The WLAN module 113 may transmit one or more pieces of data selected by the user to the outside or receive the data from the outside. According to one embodiment, the wireless LAN module 113 may acquire data from at least one of a server or another electronic device which is connected to the electronic device 100 over the network (e.g., wireless Internet network). The WLAN module 113 may transmit various pieces of data of the electronic device 100 to the outside (for example, the server) or receive the data from the outside in response to a user request. The WLAN module 113 may transmit or receive various types of data corresponding to a user's selection to or from another electronic device when a WLAN link with another electronic device is formed. The WLAN module 113 may always remain in a turned-on state or may be turned on according to a setting of the electronic device 100 or a user input.

The short range communication module 115 may be a module for performing short-range communication. As the short-range communication technology, Bluetooth, Bluetooth Low Energy (BLE), Radio Frequency Identification (RFID), Infrared Data Association (IrDA) communication, Ultra WideBand (UWB), ZigBee, or Near Field Communication (NFC), etc. can be utilized.

The short range communication module 115 may receive one or more pieces of data. According to one embodiment, the short-range communication module 115 may acquire data from another electronic device which is connected to the electronic device 100 over the network (e.g., a short-range communication network). The short range communication module 115 may transmit or receive data corresponding to a user's selection to or from another electronic device when short range communication with another electronic device is connected. The short range communication module 115 may always remain in a turned-on state or may be turned on according to a setting of the electronic device 100 or a user input.

The location calculation module 117 is a module for acquiring a location of the electronic device 100, and may include a Global Position System (GPS) module as a representative example. The location calculation module 117 may measure the position of the electronic device 100 based on the principle of triangulation. For example, the location calculation module 117 may calculate three dimensional information on a current location according to a latitude, a longitude, and an altitude, by calculating information on a distance away from three or more base stations and time information, and then applying trigonometry to the calculated information. Alternatively, the location calculation module 117 may calculate location information by continuously receiving location information on the electronic device 100 from three or more satellites in real time. The location information on the electronic device 100 may be obtained by various methods.

The broadcast receiving module 119 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, or the like).

The user input unit 120, in response to receiving a user input, may generate input data for controlling the operation of the electronic device 100. The user input unit 120 may include at least one input component to detect various user inputs. For example, the user input unit 120 may include a keypad, a dome switch, a physical button, a touch pad (resistive type/capacitive type), a jog & shuttle, and a sensor.

The user input unit 120 may be implemented in the form of buttons located outside the electronic device 100 or some or all of the user input unit 120 may be implemented in the form of touch panel. The user input unit 120 may receive a user input for initiating the operations of the electronic device 100 according to various embodiments of the present disclosure, or may generate an input signal based on a user input. For example, the user input unit 120 may receive various user inputs for executing a voice recognition function, executing an application, inputting (writing or inserting) data, changing the position of the electronic device 100, displaying contents, connecting a network, transmitting or receiving data, or the like, and may generate an input signal based on the user input.

The touch screen 130 is an input/output means for simultaneously performing an input function and a display function, and may include a display 131 and a touch detection unit 133. The touch screen 130 may provide an input/output interface between the electronic device 100 and the user, may transfer a touch input of the user to the electronic device 100, and may serve as a medium that shows an output from the electronic device 100 to the user. The touch screen 130 may show a visual output to the user. The visual output may be in the form of text, graphic, video, or a combination thereof. For example, in various embodiments of the present disclosure, the touch screen 130 may display various screens according to the operation of the electronic device 100 through the display 131. The various screens may include, for example, a voice recognition screen, a voice recognition result screen, a messenger screen, a call screen, a game screen, a video playback screen, a gallery screen, a web page screen, a home screen, or s group network connection screen, etc.

The touch screen 130 may detect an event (for example, a touch event, a hovering event, or an air gesture event) based on at least one of a touch, hovering, and air gesture from the user through the touch detection unit 133 while a particular screen is displayed through the display 131, and transmit an input signal according to the event to the controller 180. The controller 180 may differentiate the transmitted event, and control execution of an operation according to the differentiated event.

The display 131 may display (output) various pieces of information processed by the electronic device 100. For example, the display 131 may display a User Interface (UI) or a Graphic User Interface (GUI) relating to the voice recognition when the electronic device 100 operates as the voice recognition mode. Further, the display 131 may display a UI or a GUI, related to a phone call when the electronic device 100 is in a phone call mode. When the electronic device 100 is in a video call mode or a photography mode, the display 131 may display a photographed or/and received image and a UI or a GUI, related to the operation of the corresponding mode. The display 131 may display data and contents associated with the use of the electronic device 100, or information on other electronic devices connected to a network. The display 131 may display various application execution screens corresponding to executed applications.

The display 131 may support a screen display in a landscape mode according to a rotation direction (or an orientation) of the electronic device 100, a screen display according a portrait mode, and a screen display according to a change between the landscape mode and the portrait mode. Various types of displays may be used as the display 131. For example, the display 131 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. Some of the displays may be implemented as a transparent display in a transparent or photo-transparent type.

The touch detection unit 133 may be located on the display 131 and may detect a user input which contacts or approaches the surface of the touch screen 130. The user input may include a touch event or a proximity event that is input thereto based on at least one of a single-touch, a multi-touch, a hovering, or an air gesture. For example, the user input may be made in the type of a tap, drag, sweep, flick, drag & drop, a drawing gesture (for example, writing), and the like. The touch detection unit 133 may detect a user input (for example, a touch event or a proximity event) on the surface of the touch screen 130, generate a signal corresponding to the detected user input, and transfer the generated signal to the controller 180. The controller 180 may control an execution of a function corresponding to an area where the user input (for example, the touch event or the proximity event) is generated by the signal transferred from the touch detection unit 133.

The touch detection unit 133 may receive a user input for initiating the operation related to the use of the electronic device 100 and generate an input signal according to the user input in various embodiments of the present disclosure. The touch detection unit 133 may be configured to convert a change in pressure applied to a specific portion of the display 131 or a change in electrostatic capacitance generated at a specific portion of the display 131 into an electric input signal. The touch detection unit 133 may detect a location and an area of the surface of the display 131 which an input means (for example, a user's finger, an electronic pen, or the like) touches or approaches. Further, the touch detection unit 133 may be implemented to also detect pressure when the touch is made according to the applied touch type. When there is a touch or proximity input on the touch detection unit 133, a signal(s) corresponding to the touch or proximity input may be transferred to a touch screen controller (not illustrated). The touch screen controller (not illustrated) may process the signal(s), and then transmit corresponding data to the controller 180. Accordingly, the controller 180 may identify which area of the touch screen 130 is touched or approached, and process execution of a function corresponding to the touch or proximity.

The audio processor 140 may transmit, to a speaker (SPK) 141, an audio signal input from the controller 180, and may perform a function of transferring an audio signal such as a voice input from a microphone (MIC) 143 to the controller 180. The audio processor 140 may convert voice/sound data into audible sound through the speaker 141 based on the control of the controller 180 and may output the audible sound, and may convert an audio signal such as a voice or the like which is received from the microphone 143 into a digital signal and may transfer the digital signal to the controller 180. The audio processor 140 may output an audio signal corresponding to a user input according to audio processing information (for example, an effect sound, a music file, or the like) inserted into data.

The speaker 141 may output audio data received from the wireless communication unit 110 or stored in the storage unit 150. The speaker 141 may output sound signals related to various operations (functions) performed by the electronic device 100. The speaker 141 may serve to output an audio stream such as voice recognition, voice replication, digital recording, and a phone call function. Although not illustrated in an embodiment of the present disclosure, attachable and detachable earphones, headphones, or a headset may be connected to the speaker 141 of the electronic device 100 through an external port.

The microphone 143 may receive an external sound signal and process the received sound signal to be electric voice data. In a call mode of the electronic device 100, the voice data processed through the microphone 143 may be converted into the form which can be transmitted to the outside through the mobile communication module 111 and then output. Various noise reduction algorithms may be implemented in the microphone 143 to remove noise generated during the process of receiving an external sound signal. The microphone 143 may serve to input audio stream such as voice recognition, voice replication, digital recording, and a phone call function. For example, the microphone 143 may convert a voice signal into an electric signal. In an embodiment of the present disclosure, the microphone 143 may receive the user's voice at least partially based on non-directivity or directivity.

According to various embodiments of the present disclosure, the microphone 143 may include a plurality of microphones which may represent a directional pattern (for example, a first microphone, a second microphone, or a third microphone, etc.) based on a specific arrangement. When the electronic device 100 includes a plurality of microphones, the direction can be determined at least partially based on the time of the voice input to the microphones, the distance or a strength of the voice (sound) (e.g., the difference in decibels), and the speaker associated with the determined direction can be differentiated. The electronic device 100 may output sound based on the direction of the differentiated speaker. According to an embodiment of the present disclosure, the microphone 143 may include an internal microphone installed in the electronic device 100 or an external microphone connected to the electronic device 100. According to an embodiment, when performing a voice recognition function, the voice recognition can be supported by combining the internal microphone and the external microphone.

The storage unit 150 may store one or more programs executed by the controller 180 and also perform a function of temporarily storing input/output data. The input/output data may include, for example, a recorded file, contents, messenger data (e.g., communication data), contact information (for example, a wired or wireless telephone number), a message, a media file (for example, files such as audio, video, image, etc.), and the like.

The storage unit 150 may store various programs and data associated with the voice recognition function of the electronic device 100. For example, the storage unit 150 may store one or more programs that divide voice recognition sections and process different voice recognitions for each of the divided sections, and data (e.g., recognition results, training data) which is accordingly processed in various embodiments of the present disclosure.

The storage unit 150 may store the frequency of use according to the operation of the electronic device 100 (e.g., the frequency of use of the training data, the frequency of use of the applications, the frequency of use of the content, etc.), importance, and priority together. The storage unit 150 may store data related to various patterns of vibration and sound output in response to a touch input or a proximity input on the touch screen 130. The storage unit 150 may permanently or temporarily store an Operating System (OS) of the electronic device 100, a program related to an input and display control using the touch screen 130, a program related to a control of various operations (functions) of the electronic device 100, and various pieces of data generated by the operations of the programs.

The storage unit 150 may include an extended memory (for example, an external memory) or an internal memory. The electronic device 100 may also operate in relation to a web storage performing a storage function of the storage unit 150 on the Internet.

The storage unit 150 may store various pieces of software. For example, software components may include an operating system software module, a communication software module, a graphic software module, a user interface software module, a Moving Picture Experts Group (MPEG) module, a camera software module, and one or more application software modules. Further, since a module, which is the software component, may be expressed as a set of instructions, the module is also expressed as an instruction set. The module is also expressed as a program. In an embodiment of the present disclosure, the storage unit 150 may include additional modules (instructions) as well as the previously described modules. Alternatively, some modules (instructions) may not be used as necessary.

The operating system software module may include various software components for controlling a general system operation. Controlling the general system operation refers to, for example, managing and controlling a memory, controlling and managing storage hardware (device), and controlling and managing power. Further, the operating system software module may perform a function of smoothly executing communication between various pieces of hardware (devices) and the software component (module).

The communication software module may allow the electronic device to communicate with another electronic device such as a computer, a server, or a portable terminal through the wireless communication unit 110. In addition, the communication software module may be configured as a protocol structure corresponding to the communication scheme.

The graphic software module may include various software components for providing and display graphics on the touch screen 130. The term "graphics" is used to have a meaning including text, web page, icon, digital image, video, animation, and the like.

The user interface software module may include various software components related to a User Interface (UI). For example, the user interface software module may include contents relating to how the status of the user interface is changed or under what conditions the status is changed.

The MPEG module may include a software component which enables a digital content (for example, video and audio)-related process and functions thereof (for example, generation, reproduction, distribution, and transmission of contents).

The camera software module may include a camera-related software component which enables a camera-related process and functions thereof.

The application module includes a web browser including a rendering engine, email, instant message, word processing, keyboard emulation, address book, touch list, widget, Digital Right Management (DRM), voice recognition, voice replication, position determining function, location based service, and the like. According to various embodiments of the disclosure, the application module may include instructions for the voice recognition. For example, the application module may provide information corresponding to the voice recognition section which is divided based on the information configured during voice recognition and process the voice recognition for each of the divided sections.

The interface unit 160 may serve as an interface between the electronic device 100 and all external devices connected to the electronic device 100. The interface unit 160 may receive data from the external device, or receive power and then transmit the power to each of the internal configuration of the electronic device 100, or transmit data inside of the electronic device 400 to the external device. For example, the interface unit 160 may include a wired/wireless headset port, an external charger port, a wired/wireless data port, a memory card port, a port for connecting a device provided with an identification module, an audio input/output port, a video input/output port, an earphone port, and the like.

The camera module 170 corresponds to a component supporting a photography function of the electronic device 100. The camera module 170 may support photographing an image (a still image or a moving image) of a subject. The camera module 170 may photograph a predetermined subject according to a control of the controller 180 and transmit photographed data to the display 131 and the controller 180. The camera module 170 may include an image sensor (or a camera sensor) (not illustrated) for converting an input photo signal into an electric signal and an image signal processing unit (not illustrated) for converting the electric signal input from the image sensor into a digital image data. The image sensor may include a sensor using a Charge-Coupled Device (CCD) or a Complementary Metal-Oxide-Semiconductor (CMOS). The camera module 170 may support an image processing function to support photographing according to various photographing options (e.g., zooming, a screen ratio, or an effect (e.g., sketch, mono, sepia, vintage, mosaic, and a picture frame)) in accordance with a user's settings.

The controller 180 may control a general operation of the electronic device 100. For example, the controller 180 may perform a control operation related to voice communication, data communication, video communication, etc. The controller 180 may include one or more processors or may be called a processor. For example, the controller 180 may include a Communication Processor (CP), an Application Processor (AP), an interface (for example, General Purpose Input/Output: GPIO), or an internal memory, as a divided component, or integrate them into one or more integrated circuits. The application processor may execute various software programs to perform various functions for the electronic device 100, and the communication processor may process and control voice communication and data communication. Further, the controller 180 may execute a particular software module (instruction set) stored in the storage unit 150 to serve various particular functions corresponding to the module.

According to various embodiments of the present disclosure, the controller 180 may control an operation related to the performance of the voice recognition function. For example, the controller 180 may determine the orientation of the speaker during an operation of initiating the voice recognition of the electronic device 100, and control to change a beamforming direction of the microphone 143 so as to correspond to the orientation of the determined speaker. When initiating the voice recognition, the controller 180 may control to check a type of divided voice recognition sections (e.g., the first section, second section), and process the voice recognition section for each section corresponding to the checked divided type of the voice recognition section. For example, the controller 180 may control to perform different types of voice recognition with respect to voices input in a first section (e.g., a beam forming section) and a second section (e.g., the recognition section) which correspond to the checked type of the divided voice recognition sections. The controller 180 may control to display, on a display 131, at least a part of the speaker information, the speaker's direction information or distance information of the speaker, or the recognition result. The controller 180 may control to generate the training data during the operation of proceeding the voice recognition, and store the generated training data internally (e.g., in the storage unit 150) or externally (for example, in another electronic device, a server).

The controller 180 may differentiate the speakers and the speakers' positions (distance and direction) during the voice recognition.

According to various embodiments of the present disclosure, the controller 180 may acquire angle information on the direction having a higher energy by using one or more microphones, and determine the direction of a sound by using a phase difference when the voice arrives. The controller 180 may determine the area of the speaker according to the sound source based on the direction accumulated for a predetermined time, and process the sound as a noise or meaningless voice when a sound having a predetermined volume or less, or having a large difference value with an average angle value of the previous sound is input. When recognizing a voice, the controller 180 may largely divide the voice recognition section into a beam forming section (e.g., a voice non-recognition section, a non-directivity recognition section, and a non-directivity based recognition section) and a recognition section (for example, a voice recognition section, a directivity recognition section, and a directivity based recognition section), and process different types of voice recognition operations for each of the divided voice recognition sections. In addition, the controller 180 may process various pieces of information (e.g., the recognition result, training data) based on the result of executing the voice recognition operation.

According to various embodiments of the present disclosure, controller 180, which includes hardware such as circuitry configured for operation, may perform the voice recognition operation of the electronic device 100 as described above in various embodiments, in conjunction with software modules stored in the storage unit 150. According to various embodiments of the present disclosure, the controller 180 may be embodied as one or more modules including hardware that executes various functions described above. According to various embodiments of the present disclosure, the controller 180 may be embodied as one or more processors (or micro-processors) that control various operations of the electronic device 100 according to various embodiments of the present disclosure by executing one or more programs stored in the storage unit 150. For example, the controller 180 may be embodied by including a voice recognition unit 185, which includes at least a part of a direction detection module which will be described infra, a beam-former, a feature extraction module, a decoder, a modeling module, a training module, and an output module.

In an embodiment of the present disclosure, the voice recognition unit 185 shows a structure including hardware that in conjunction with software supports voice recognition when the voice of the user input to the microphone 143 is delivered through the audio processor 140. The microphone includes hardware such as a transducer to convert mechanical vibrations of sound into electrical signals. The voice recognition unit 185 may process the voice recognitions for the beam forming section and the recognition section, depending on the configured type of the divided voice recognition sections.

For example, the voice recognition unit 185 does not perform the voice recognition process for the input voice in the beam forming section, non-directionally processes the voice recognition in the beam formation section, or may non-directionally and directionally process the voice recognition while putting a higher (i.e. greater) weight on the non-directivity. In addition, the voice recognition unit 185 may process the voice recognition for the input voice in the recognition section, directionally process the voice recognition in the recognition section, or non-directionally and directionally process the voice recognition while putting a greater weight on the directivity.

In the following description, the voice recognition section may be largely divided into the beam forming section and the recognition section. In various embodiments of the present disclosure, the beam formation section may be used as a term including a voice non-recognition section, a non-directivity recognition section, or a non-directivity based recognition section, and the recognition section may be used as a term including a voice recognition section, a directivity recognition section, or a directivity based recognition section.

The voice non-recognition section may indicate a section being excluded from the voice recognition with respect to the input voice, and the voice recognition section may indicate a section that processes the voice recognition for a voice which is input after the non-recognition section (after a predetermined time for beamforming has elapsed). Further, the non-directivity recognition section may indicate a section for non-directionally receiving a voice and processing the voice recognition therefor, and the directivity recognition section may indicate a section for directionally receiving a voice and processing the voice recognition therefor. In addition, the non-directivity based recognition section may indicate, for example, a section for simultaneously receiving a voice non-directionally and directionally and processing the voice recognition by setting a higher weight to the non-directionally input voice, and the directivity-based recognition section may indicate a section for simultaneously receiving a voice non-directionally and directionally and processing the voice recognition by setting a higher weight to the directionally input voice.

The controller 180 according to an embodiment of the present disclosure may control various operations related to general functions of the electronic device as well as the above-described functions. For example, when a specific application is executed, the controller 180 may control an operation and displaying of a screen for the specific application. Further, the controller 180 may receive input signals corresponding to various touch event or proximity event inputs supported by a touch-based or proximity-based input interface (for example, the touch screen 130) and may control execution of functions according to the received input signals. Moreover, the controller 180 may also control data transmission/reception based on wired communication or wireless communication with capabilities for transmission of a plurality of different wireless protocols.

The power supply unit 190 may receive external power and internal power and may supply the power required for an operation of each component under the control of the controller 180. In an embodiment of the present disclosure, the power supply unit 190 may supply or block (on/off) power to the display 131 and the microphone 143 under a control of the controller 180.

The various embodiments of the present disclosure may be implemented in a non-transitory machine readable recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions, just to name some non-limiting examples.

According to various embodiments of the present disclosure, there is provided a computer-readable recording medium having a program thereon, where the program when executed by a processor causes the computer to execute the following operations: dividing a voice recognition section for recognizing a voice into a first section and a second section; and processing different types of voice recognitions with respect to the voice input during the first section and the voice input during the second section.

In some cases, the embodiments described in the present specification may be implemented within the controller 180. Furthermore, according to the software implementation, the embodiments such as procedures and functions described in the present specification may also be implemented as separate software modules that are executed in conjunction with hardware. The software modules, in conjunction with hardware, may perform one or more functions and operations described in the present specification.

According to various embodiments of the present disclosure, at least a part of functions (for example, a voice recognition function) performed by the electronic device 100 may be performed by an external device thereof (e.g., a server). For example, the server may include a processing module including circuitry configured for operation corresponding to the controller 180, in order to divide the voice recognition sections by using the processing module, process at least a part of the function associated with the execution of the voice recognition for each of the divided sections, and transmit the processed result to the electronic device 100.

Figure 2:
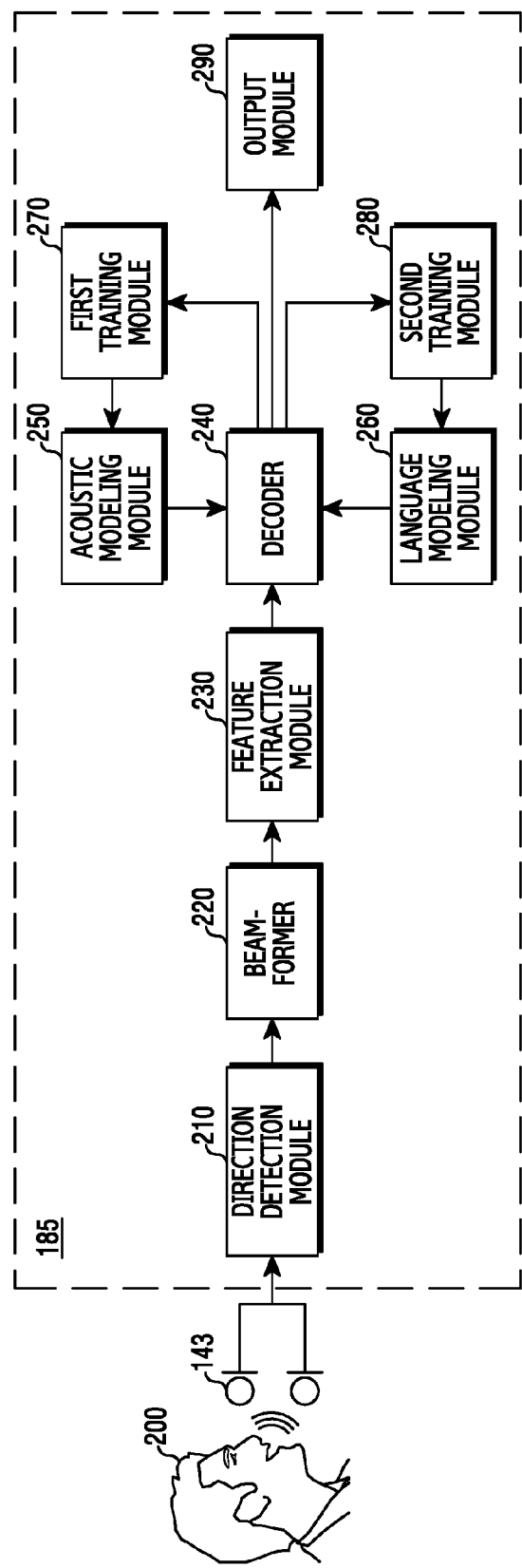
FIG. 2 is a diagram showing a configuration of a voice recognition unit in an electronic device according to an embodiment of the present disclosure.

FIG. 2 is a diagram of a configuration of a voice recognition unit 185 in an electronic device according to an embodiment of the present disclosure.

Referring now to FIG. 2, the voice recognition section 185 of the electronic device 100 may include a direction detection module 210, a beam-former 220, a feature extraction module 230, a decoder 240, an acoustic modeling module 250, a language modeling module 260, a first training module 270, a second training module 280, and an output module 290.

With continued reference to FIGS. 1 and 2, the microphone 143 may receive a voice of the user 200, convert the user's voice to an electrical signal (i.e. a voice signal through the audio processor 140 (which includes hardware such as circuitry configured for operation that may include integrated circuits) and then provides the converted voice signal to the direction detection module 210.

Referring again to FIG. 2, the direction detection module 210 may detect the direction (position) of the user (the one speaking) 200 from the input of the voice signal. According to an embodiment, the direction detection module 210 may determine the direction of the user 200 based on one or more of at least a part of the time, the distance of the voice input to the microphone 143 or strength (e.g., the difference in decibels) of the sound. The direction detection module 210 may provide the determined result (e.g., the direction information) to a beam-former 200.

With continued reference to FIG. 2, the beam-former 220 may acquire direction information of the direction detection module 210, and forms the beam in a direction corresponding to the acquired direction information so in order to input a target voice (e.g., a voice of the user 200) with increased accuracy to the microphone 143. Here, when the beam is not directed toward the user 200, a predetermined time (e.g., tracking time) (for example, 0.3 seconds) may be delayed in order to form a beam that corresponds to the direction (position) of the user 200, and because the voice of the user 200 may not be correctly input through the microphone 143 during the predetermined time. Thus, in the embodiment of the present disclosure, provided are various measures to improve the problem of lowering the voice recognition rate due to a certain time required for forming the beam, such as delaying the beam formation by the predetermined time.

The feature extraction module 230, which is configured to extract a feature (e.g., formant information, Linear Predictive Coding (LPC) coefficients, total power components, etc.) of a corresponding voice from the voice signal that is input through the microphone 143. The feature extraction module 230 may generate the feature information corresponding to the extracted feature, and may provide the generated feature information to the decoder 240. The decoder includes circuitry such as a processor or microprocessor configured for operation.

Meanwhile, the electronic device 100 may generate and manage a single model for each spoken phrase (e.g., training data learned by using the input voice) based on the extracted feature information as described above. For example, the electronic device 100 may generate a model using a probability statistical method. According to one embodiment of the present disclosure, one of the input spoken phrases during the voice recognition is analyzed, the feature information on the analyzed spoken phrase is extracted, the extracted feature is compared with previously-created features of the spoken phrases, and the recognition result is output with respect to the closest spoken phrase based on, for example, matching with previously-created features of the spoken phrases. To this end, the electronic device 100 may include one or more modeling modules and training modules configured to correspond to the modeling modules. For example, the electronic device 100 may include an acoustic modeling module 250 for generating a probabilistic model of a phone unit in the training module (e.g., a first training module 270) through training, and a language model module 260 for generating a language probabilistic model through training in the training module (e.g., a second training module 280). Various modeling modules and training modules in the electronic device 100 may be designed in order to increase the voice recognition rate of the voice of the user 200.

The decoder 240 may decode the feature information output from the feature extraction module 230, and provide the decoded information to the training module (e.g., in the case a first training module 270 and a second training module 280) and the output module 290. The decoder 240 may compare models acquired from the acoustic modeling module 250, and the language model module 260 and the feature information provided from the model feature extraction module 230, and output after finding a phoneme with the highest probability.

The training module (e.g., the first training module 270 and the second training module 280) may perform training for each model (e.g., training data), based on the voice signal passed from the decoder 240. In an embodiment of the present disclosure, data and the model required for the acoustic modeling and language modeling may be stored in at least one of the storage unit 150 of the electronic device 100, a server, or another electronic device that is connected through a network, and may be periodically or intermittently updated.

The output module 290 may output information (for example, the recognition result) corresponding to the voice input from the user 200 based on data (e.g., voice signals) decoded by the decoder 240. For example, the output module 290 may output a command or text recognized in response to the voice signal.

The term "module" as used in various embodiments of the present disclosure includes structure and is not, for example, pure software or software per se, and may include one of hardware, software executed in conjunction with hardware, and firmware or any combination of two or more of them. The "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

Various embodiments disclosed herein are provided aid a person of ordinary skill in the art with technical details of the present disclosure provided for illustrative purposes, and do not limit the scope of the present disclosure including the scope of the appended claims. Therefore, it should be construed that all modifications and changes or modified and changed forms based on the technical idea of the present disclosure fall within the scope of the present disclosure.

As shown in FIG. 2, the user (i.e. one speaking) 200 may operate the electronic device 100 and perform a voice recognition function, and the electronic device 100 may perform voice recognition function in response to a request of the user 200. Alternatively, the electronic device 100 may automatically run the voice recognition function in response to the execution of a pre-installed application. When executing the voice recognition function, the electronic device 100 may activate (e.g., turn on) the microphone 143 of the electronic device 100. The user 200 may execute the voice recognition function of the electronic device 100 and speak a specific phrase (for example, "hi galaxy"), and the phrase which has been spoken by the user 200 is input through the microphone 143 and is conventionally signal processed by the audio processor 140, and then input to the controller 180 (e.g., a voice recognition unit 185).

Figure 3:
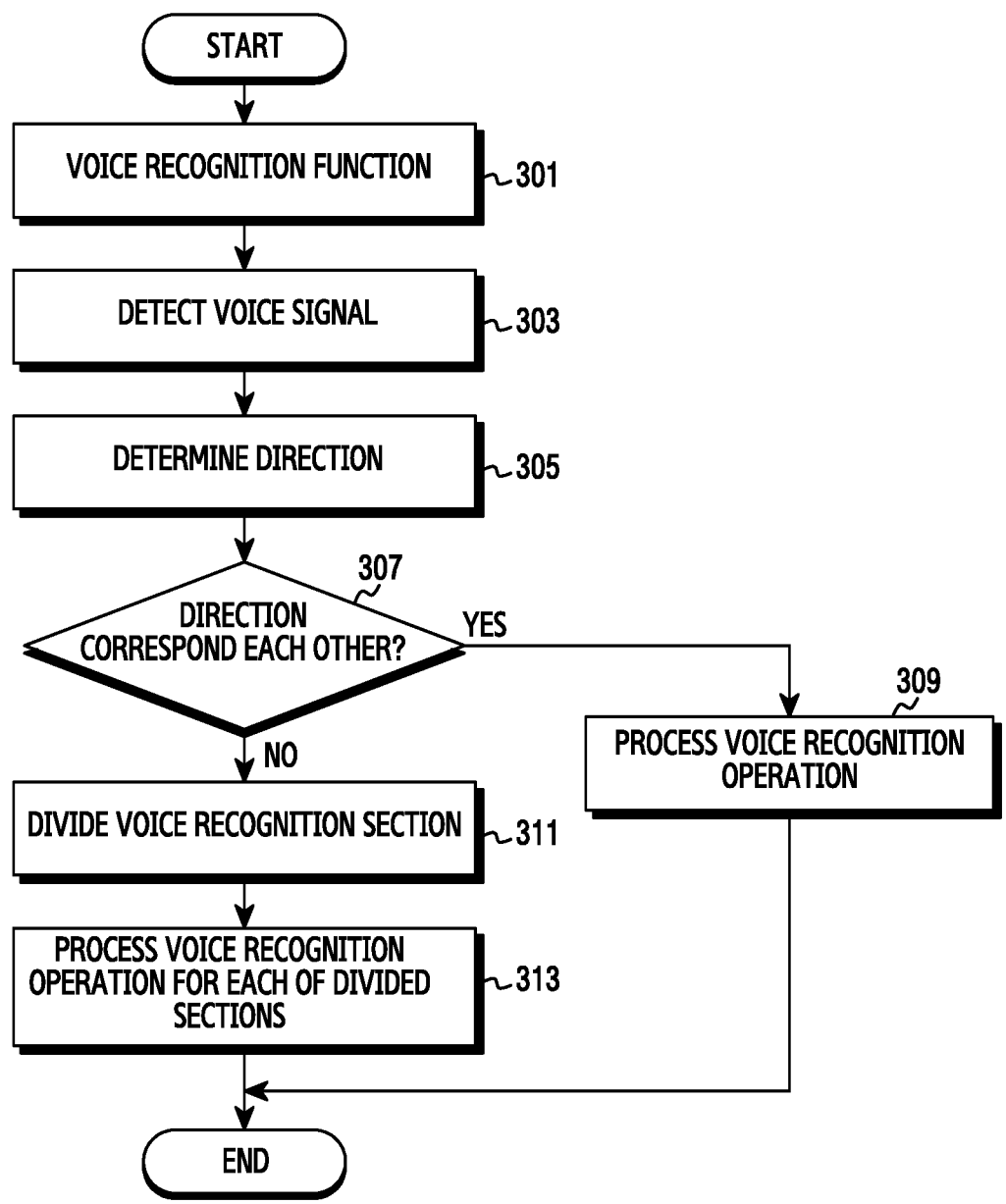
FIG. 3 is a flowchart illustrating an operational procedure for processing voice recognition in an electronic device according to an embodiment of the present disclosure.

FIG. 3 is a flowchart illustrating an operational procedure for processing voice recognition by an electronic device according to an embodiment of the present disclosure.

Referring now to FIG. 3, in operation 301, the controller 180 performs a voice recognition function. For example, the controller 180 may operate the electronic device 100 and receive a user input for requesting the execution of the voice recognition function, and execute the voice recognition function in response to the user input. When executing a voice recognition function, the controller 180 may further comprise an optional activation of the microphone 143 depending on the activation state (e.g., on/off) of the microphone 143.

In operation 303, the controller 180 may detect an input of the voice signal through the microphone 143. For example, when the user 200 speaks a phrase, and the phrase may be input to the microphone 143 installed in the electronic device 100. The microphone 143 may receive an input of the phrase, transduce the sound vibrations that were input into an electric signal (a voice signal), and then transmit the transduced signal to the controller 180.

In operation 305, the controller 180 may determine an orientation of the speaker based on an input voice signal when the voice signal is input through the microphone 143. For example, controller 180 may perform a calculation based on the voice signal input from the microphone 143 by using a sound source position tracking method in view of, for example, a Time Difference of Arrival (TDOA) of the voice signal. The algorithm (as described above TDOA), may indicate a method for tracking the position of the sound source by using an arrival delay difference of a sound source (voice signal) incoming from a plurality of microphones (a microphone array) (for example, a first microphone, a second microphone, and a third microphone) installed in different locations. According to one embodiment, the controller 180 may measure a relative time delay that is present between voice signals (e.g. a waveform of the voice signal) by using the TDOA. Alternatively, the controller 180 may perform a calculation on the voice signal input from the plurality of microphones, using a sound source position tracking method based on Steered Response Power (SRP) which compares a frequency, a phase, or sound pressure of the voice signal. Furthermore, the controller 180 may be configured to use a combination of algorithms for the sound track. In an embodiment of the present disclosure, the controller 180 may determine the direction (orientation of the person speaking) of the sound source on the basis of a result of the calculation. For example, the controller 180 may determine the direction of the sound source from the calculation result through the sound source position tracking algorithm, such as the aforementioned TDOA or SRP, and determine the speaker's direction (position) based on the direction of the sound source. An artisan understands the operations of an SRP and the TDOA, and a detailed discussion is not provided herein so as not to obscure the artisan's appreciation of the disclosure with that which is known.

With continued reference to FIG. 3, in operation 307, the controller 180 may determine the beamforming direction of the microphone 143 based on a result of the determination operation (for example, the speaker's direction/orientation). For example, the controller 180 may determine whether the direction of the speaker and the beamforming direction correspond to each other with a predefined error range (e.g., whether to the directions coincide with each other within a configured error range). For example, the error range may include 1 to 3 degrees, 1 to 5 degrees, or a difference less than 5 degrees, less than 10 degrees, etc.

In the operation 307, when it is determined that the direction of the speaker and the beamforming direction correspond to each other ("Yes" in operation 307), the controller 180 may process the voice recognition operation in response to the voice signal input through the microphone 143, in operation 309. According to various embodiments, the controller 180 performs the voice recognition operation for the input voice signal on the basis of the training data learned in advance based on the beamforming input voice.

In the operation 307, when it is determined that the direction of the speaker and the beamforming direction do not correspond to each other ("No" in operation 307), the controller 180 may divide the voice recognition section for voice recognition, based on a configured dividing method (for example, a beam forming section and a recognition section (for example, a voice non-recognition section and a voice recognition section, a non-directivity recognition section & a directivity recognition section or a non-directivity based recognition section & directivity based recognition section)).

In the following description, in a case where the speaker's direction and the beamforming direction are different from each other, the beam forming section (e.g., the voice non-recognition section, the non-directivity recognition section, the non-directivity based recognition section) may be used as a term which includes a section where the speaker's voice is not correctly input during a predetermined time (e.g., tracking time) (for example, 0.3 seconds) required for the formation of the beamforming direction to correspond to the direction of the speaker. The beam formation section may include a section from a time of detecting a voice signal through the microphone 143 to the predetermined time (e.g., 0.3 seconds). The beam formation section may indicate a section which does not process voice recognition regardless of whether the voice signal is input, receives the voice signal non-directionally and processes the voice recognition thereof, or simultaneously receives the voice signal non-directionally and directionally, and processes the voice recognition thereof while placing a weight on the non-directivity.

The recognition section (e.g., the voice recognition section, the directivity recognition section, and the directivity based recognition section) corresponds to a section after the beam has been formed in the direction to correspond to the direction of the speaker, and may be used as a term which includes a section where the speaker's voice is successfully recognized (input). The recognition section may include a section from after the beam forming section (e.g., 0.3 seconds after detecting a voice signal through the microphone 143) till the end of the voice recognition operation. The recognition section may indicate a section which processes the voice recognition from the time point of being determined as a correctly input voice, receives the voice signal after being changed from non-directional to directional and processes voice recognition, or simultaneously receives the voice signal non-directionally and directionally and processes the voice recognition while placing a weight on the directivity.

In operation 313, controller 180 may process a voice recognition operation for each section in response to the method for dividing the voice recognition section.

For example, in a method for dividing a voice recognition section into the voice non-recognition section and the voice recognition section, the controller 180 may omit a recognition process for a voice input during a non-recognition section and perform the recognition process for only the voice input during the voice recognition section.

Alternatively, in a method for dividing the voice recognition section into a non-directivity recognition section and a directivity recognition section, the controller 180 may receive the voice non-directionally and perform the recognition process in the non-directivity recognition section, and receive the voice directionally corresponding to the direction on which a beam is formed and process the recognition process in the directivity recognition section.

Alternatively, in a method for dividing the voice recognition section into a non-directivity based recognition section and a directivity based recognition section, the controller 180 may simultaneously receive the voice both non-directionally and directionally and perform the recognition process while putting a weight on the non-directionally input voice during the non-directivity based recognition section, and simultaneously receive the voice non-directionally and directionally and perform the recognition process while putting a weight on the directionally input voice during the directivity based recognition section.

Meanwhile, the controller 180 may terminate a voice recognition function, during the process of the operation according to the voice recognition function, when there is a user input by an interface (e.g., an end button) configured to terminate the voice recognition function, or when the voice signal input to the microphone 143 is not detected for a preconfigured time (for example, T seconds, T is a natural number) or more. In addition, when the voice recognition function is terminated, or during the processing of the voice recognition function, the controller 180 may output a command or text corresponding to the voice recognized at the voice recognition section, or process a function corresponding thereto.

In various embodiments of the present disclosure, at least one method among various methods may be configured in order to improve the voice recognition rate based on voice recognition, and perform the voice recognition process corresponding to the configured at least one method. In an embodiment of the present disclosure, the division of the beam forming section and the recognition section is to prevent the decrease of the voice recognition rate due to the first syllable of the voice is being incorrectly input or truncatedly input to the microphone 143 during a predetermined time (e.g., 0.3 seconds) to form a beam.

According to various embodiments of the present disclosure, the voice input in the beam forming section (e.g., the voice non-recognition section) (for example, a section in which the first syllable of the voice is not input, or truncatedly input) may be ignored (omit the recognition processing for the input voice signal), and a recognition process for the voice input from the recognition section (e.g., the voice recognition section) during which the beamforming is complete (e.g., beam forming to the direction of the speaker) may be performed.

Further, according to various embodiments of the present disclosure, a non-directional (omni-directional) voice recognition processing may be performed for the voice input in the beam forming section (e.g., a non-directivity recognition section), and a directional voice recognition process may be performed for the voice input in the recognition section (e.g., a directivity recognition section).

Furthermore, according to various embodiments of the present disclosure, the voice recognition process may be performed by applying different weights to all the voice recognition sections corresponding to the beam forming section (e.g., the non-directivity based recognition section) and the recognition section (e.g., the directivity based recognition section), based on a Soft Decision (SD) technique. For example, in an early part of the voice recognition (e.g., a beam forming section), the voice recognition process may be performed based on a configuration ratio between non-directivity (for example, W: 0.9) and directivity (e.g., W: 0.1), and in middle and later parts of the voice recognition (e.g., a recognition section), the voice recognition process may be performed based on a configuration ratio between non-directivity (for example, W: 0.2) and directivity (e.g., W: 0.8).

In addition, according to various embodiments of the present disclosure, the beamforming input voice may be processed to be trained and training data corresponding to the beamforming input voice may be acquired based on the training. Thus, according to an embodiment of the present disclosure, a more accurate voice recognition result may be output with respect to the beamforming input data on the basis of the training data learned in advance. In the embodiment of the present disclosure, the training data may be stored in at least one of an electronic device 100, another external electronic device or an external server.

Hereinafter, the above various embodiments for improving the voice recognition rate will be described. In the following, when describing the various operations described above, as described in FIG. 3, it will be described on an assumption that pre-operations for dividing the voice recognition section have been proceed, such as an operation of executing the voice recognition function in operation 301, and an operation of detecting the voice signal in operation 303.

Figure 4:
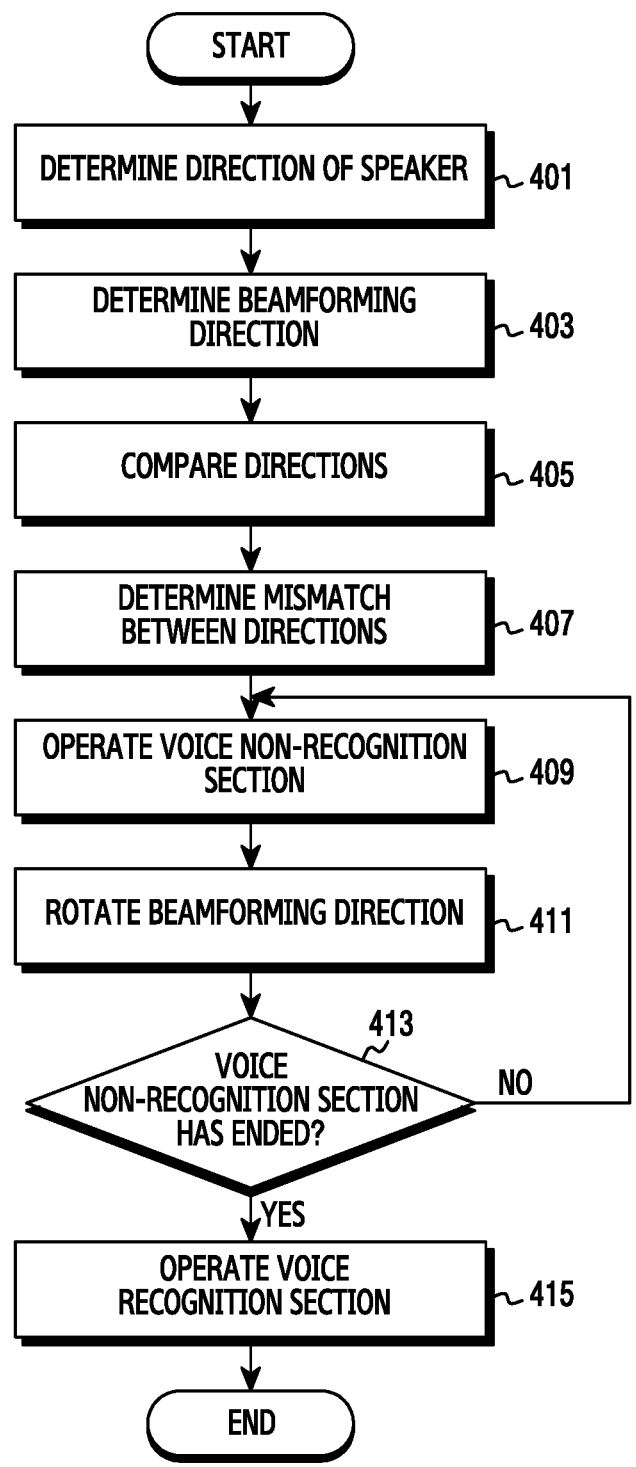
FIG. 4 is a flowchart illustrating an operational procedure of processing voice recognition in an electronic device by dividing a voice recognition section according to an embodiment of the present disclosure.
Figure 5:
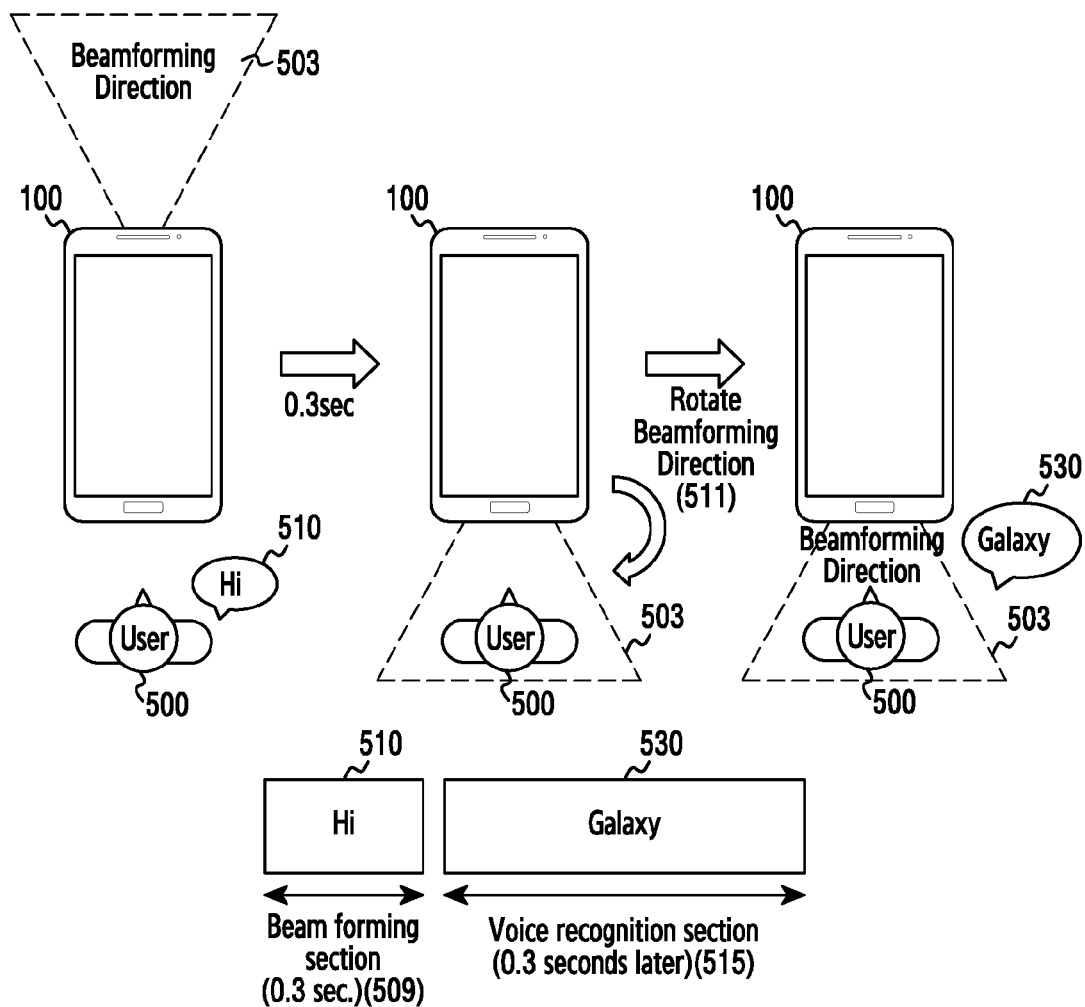
FIG. 5 is a diagram illustrating the processing of voice recognition by dividing a voice recognition section in an electronic device according to an embodiment of the present disclosure.

FIG. 4 is a flowchart illustrating an operational procedure of processing voice recognition by dividing a voice recognition section in an electronic device according to an embodiment of the present disclosure, and FIG. 5 is a diagram shown for illustrating operations corresponding to FIG. 4.

Referring now to FIGS. 4 and 5, in operation 401, the controller 180 may determine the direction of the speaker 500. For example, the controller 180 may calculate the input voice signal based on the configured method when the voice signal of the speaker 500 is input through the microphone 143, and determine that the orientation of the speaker 500 (the direction of the sound source) based on the calculated result.

In operation 403, the controller 180 may determine the currently formed beamforming direction. For example, as shown in FIG. 5, a beamforming direction 503 of the electronic device 100, may be in a state where it is formed in the opposite direction to the position of the speaker 500, and the controller 180 may identify the currently formed beamforming direction 503 from the configured various information (for example, beamforming direction configuration (storing) information or beamforming direction tracking information). The currently formed beamforming direction may be either a specific direction that is fixed in advance, or may be any particular direction lastly formed in the voice recognition functions that have been previously executed.

In operation 405, the controller 180 may compare the direction of the speaker 500 and the beamforming direction 503 to determine the degree of matching therebetween. In an embodiment of the present disclosure, the degree of matching between directions (e.g., the direction of the speaker 500 and the beamforming direction 503) may be compared based on the acquired respective direction information (e.g., an angle), and the matching or not between them may be determined depending on whether the result value (for example, the value of angular difference) of the comparison operation is included in an error range configured in advance.

In operation 407, when it is determined that the direction of the speaker 500 and the beamforming direction 503 do not match each other, based on the result of the comparison operation, the controller 180 may process to operate in the voice non-recognition section (beam forming section), in operation 409. For example, as illustrated above, the beamforming direction 503 of the electronic device 100 may be formed in the opposite direction to the speaker 500. When it is determined that the beamforming direction 503 and the direction of the speaker 500 do not match each other, the controller 180 may process the voice recognition operation in the voice non-recognition section (beam forming section) 509. According to one embodiment, when determining an operation in the voice non-recognition section 509, the controller 180 may omit (exclude) the voice recognition process with respect to a voice signal (for example, Hi 510) input through the microphone 143, before determining the voice non-recognition section 509 or during the voice non-recognition section 509. That is, the controller 180 may ignore the processing of the voice signal input during the voice non-recognition section 509.

In operation 411, the controller 180 may configure (e.g. change) the beamforming direction 503 currently formed in the electronic device 100 to correspond to the direction of the speaker 500. For example, the controller 180 may rotate the beamforming direction 503 of the electronic device 100, as an example of an operation 511 in FIG. 5, to the direction of the speaker 500.

In operation 413, the controller 180 may determine whether the voice non-recognition section 509 has ended.

For example, the controller 180 may determine whether a predetermined time (for example, 0.3 seconds) required to form (for example, rotate the beamforming direction 511) the beamforming direction 503 in the voice non-recognition section 509 so as to correspond to the direction of the speaker 500 has expired (rotation to the beamforming direction has been completed).

In operation 413, when determining that the voice non-recognition section 509 has not ended ('No' in operation 413), the controller 180 may proceed to the operation 409 to perform following operations.

In operation 413, when determining that the voice non-recognition section 509 has ended ('Yes' in operation 413), the controller 180 may process to operate the voice recognition section in operation 415. For example, as shown in FIG. 5, a voice recognition section 515 may operate after the voice non-recognition section (beam forming section) 509, that is, from the time point at which the beamforming direction 503 corresponds to the direction of the speaker 500, and the voice recognition process may be performed on the voice signal (for example, Galaxy 530) input through the microphone 143 in the voice recognition section 515.

According to an embodiment of the disclosure, as the examples of FIGS. 4 and 5, all voice recognition sections according to the voice recognition may be divided into the voice non-recognition section 509 and the voice recognition section 515, an abnormal or incorrect voice signal input in the voice non-recognition section 509 may be excluded from the voice recognition operation, and a normal voice recognition may be performed on the voice signal input in the voice recognition section 515. Therefore, an error due to an incorrect voice signal in the voice non-recognition section 509 can be prevented in advance, so as to increase the voice recognition rate.

Figure 6:
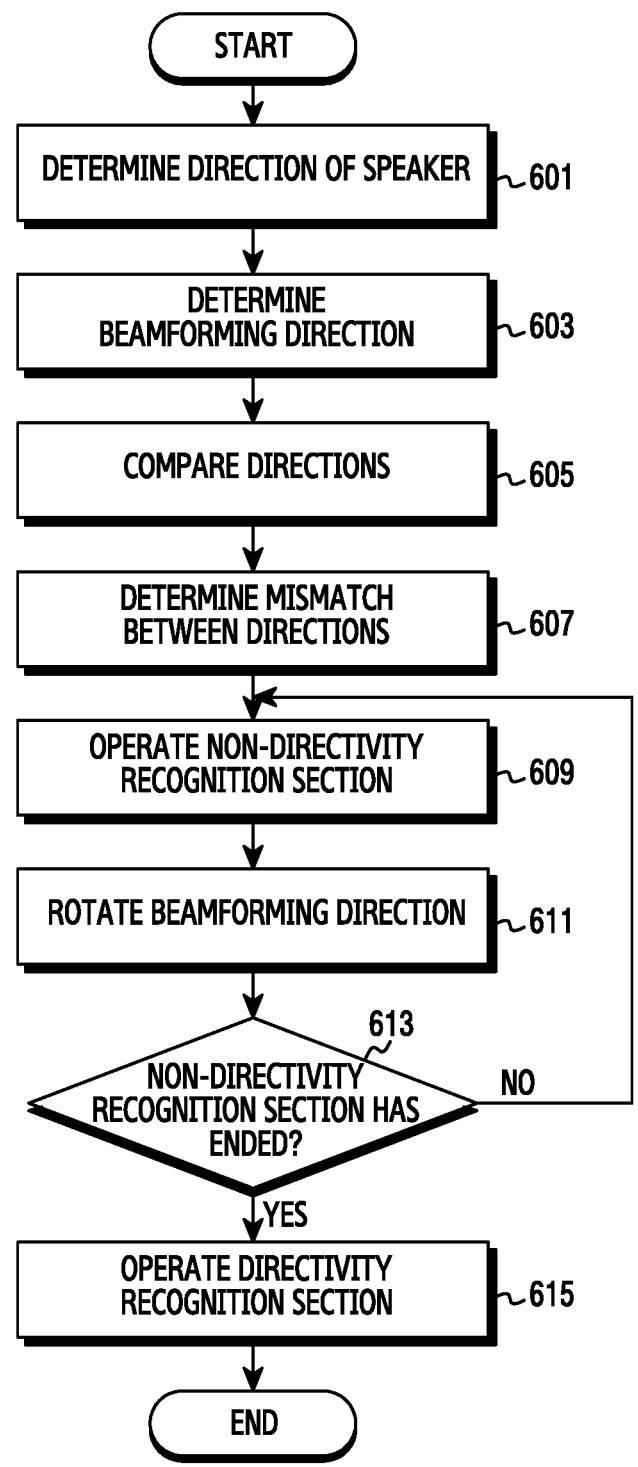
FIG. 6 is a flowchart illustrating operations by an electronic device of processing voice recognition by dividing a voice recognition section according to an embodiment of the present disclosure.
Figure 7:
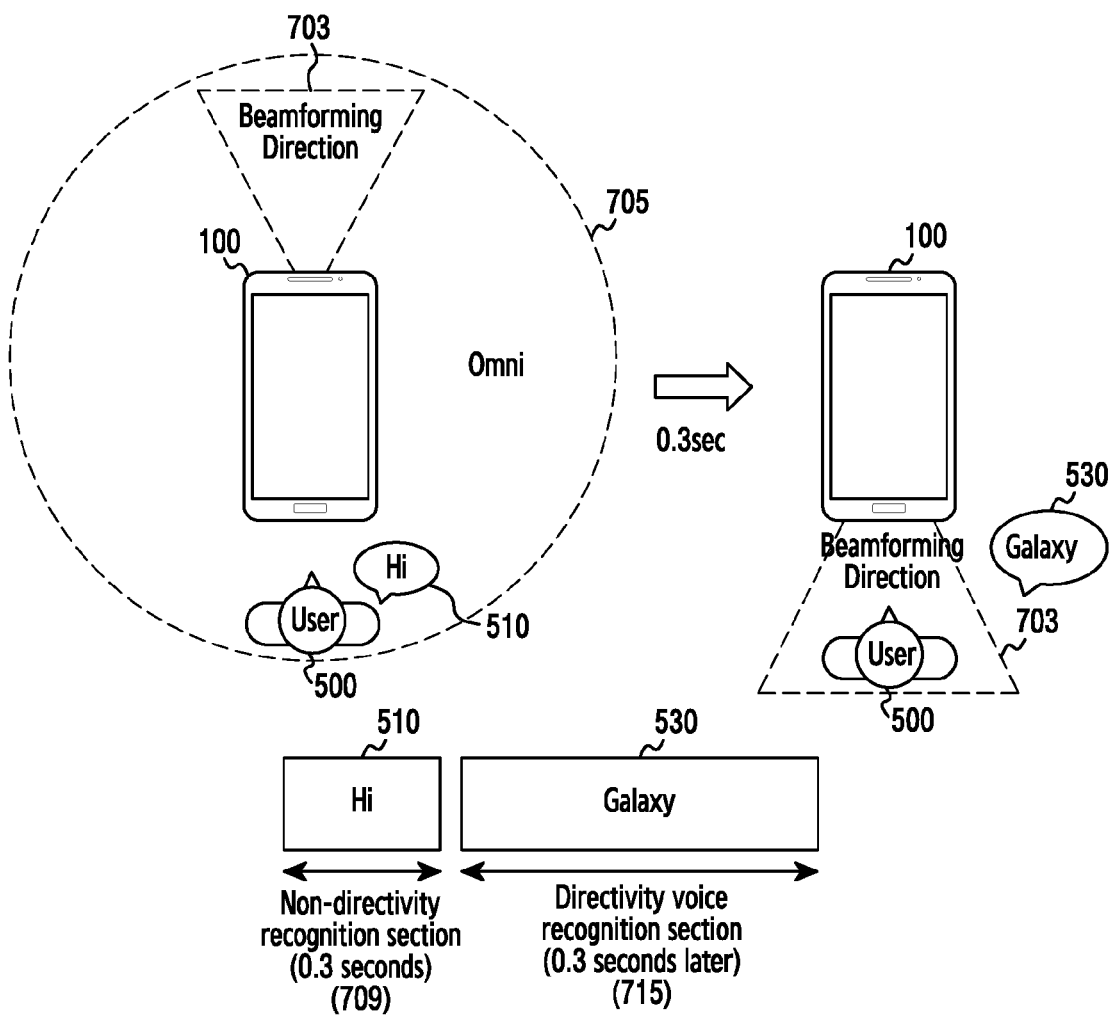
FIG. 7 is a diagram illustrating an operation of processing voice recognition in conjunction with FIG. 6.

FIG. 6 is a diagram for explaining an operation procedure of processing voice recognition by dividing a voice recognition section in an electronic device according to an embodiment of the present disclosure, and FIG. 7 is a diagram shown for illustrating operations corresponding to FIG. 6.

With reference to FIG. 6, an operation 601, an operation 603, an operation 605, and an operation 607 may be performed by including operations corresponding to the descriptions of the operation 401, the operation 403, the operation 405, and the operation 407, respectively, described with reference to FIG. 4. Therefore, in FIG. 6, descriptions for the operations corresponding to the above-described operations in FIG. 4 will be omitted.

Referring now to FIGS. 6 and 7, in operation 607, when determining that a direction of the speaker 500 and a beamforming direction 703 do not match each other according to a result of an operation (in operation 605) of comparing the direction of the speaker 500 and the beamforming direction 703, the controller 180 may process to operate in a non-directivity recognition section (a beam formation section) in operation 609. For example, as illustrated in FIG. 7, the beamforming direction 703 of the electronic device 100 may be formed in the opposite direction to the speaker 500. When it is determined that the beamforming direction 703 and the direction of the speaker 500 do not match each other, the controller 180 may process the voice recognition operation in the non-directivity recognition section (a beam forming section) 709. According to one embodiment, when determining an operation in the non-directivity recognition section 709, the controller 180 may process the voice recognition non-directionally with respect to a voice signal (for example, Hi 510) input through the microphone 143, before determining the non-directivity recognition section 709 or during the non-directivity recognition section 709. That is, the controller 180 may recognize the voice as non-directional 705 for a predetermined period of time (for example, 0.3 seconds) for forming a beamforming direction 703 to the direction of the speaker 500.

In operation 611, the controller 180 may configure (change) the beamforming direction 703 currently formed in the electronic device 100 so as to correspond to the direction of the speaker 500. For example, the controller 180 may rotate the beamforming direction 703 of the electronic device 100, as shown in FIG. 7, to the direction of the speaker 500.

In operation 613, the controller 180 may determine whether the voice recognition section 709 has ended. For example, the controller 180 may determine whether a predetermined time (for example, 0.3 seconds) required to form the beamforming direction 703 in the non-directivity recognition section 709 so as to correspond to the direction of the speaker 500 has expired (the rotation to the beamforming direction has been completed).

In operation 613, when determining that the non-directivity recognition section 709 has not ended ('No' in operation 613), the controller 180 may proceed to the operation 609 to perform the following operations.

In operation 613, when determining that the non-directivity recognition section 709 has ended ('Yes' in operation 613), the controller 180 may process to operate as the directivity recognition section, in operation 615. For example, as shown in FIG. 7, the voice recognition section may operate in a directivity voice recognition section 715 after the non-directivity recognition section 709, that is, from the time point at which the beamforming direction 703 corresponds to the direction of the speaker 500, and may perform the voice recognition process of applying the beamforming for the audio signal (such as Galaxy 530) input through the microphone 143 in the directivity recognition section 715. That is, the controller 180 may recognize the voice directionally when the beam is formed in a direction of the speaker 500.

According to an embodiment of the disclosure, as in the examples of FIG. 6 and FIG. 7, the total voice recognition section according to the voice recognition may be divided into a non-directivity recognition section 709 and a directivity voice recognition section 715, and in the non-directivity recognition section 709, a voice recognition operation may be performed after non-directionally (omni-directionally) 705 receiving a voice signal of the speaker 500, and in the directivity voice recognition section 715, a voice recognition operation may be performed after directionally receiving the voice signal of the speaker 500 in the formed beamforming direction. Thus, an embodiment of the present disclosure may allow another suitable voice recognition operation to be performed for each section of the divided voice recognition sections to improve the voice recognition rate.

Figure 8:
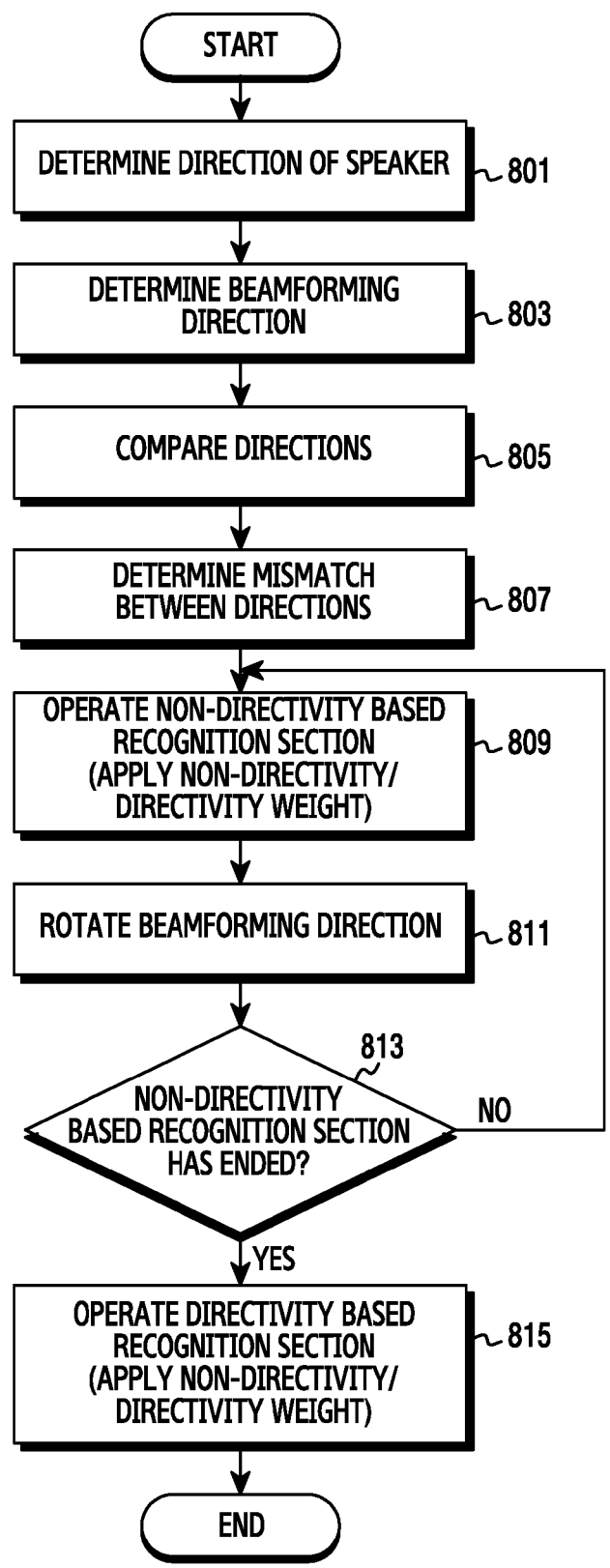
FIG. 8 is a flowchart illustrating the comparing of a direction of a user's speech and a beamforming direction according to an exemplary embodiment of the present disclosure.
Figure 9:
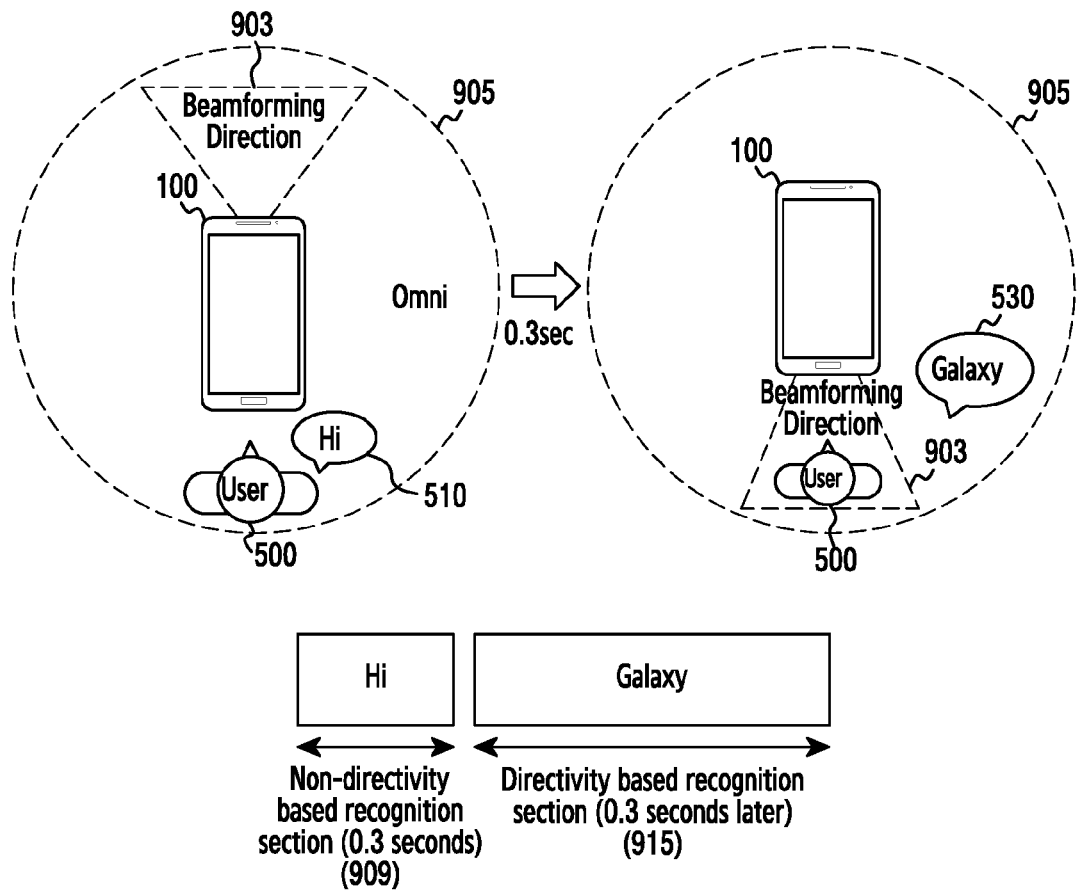
FIG. 9 is a diagram further illustrating FIG. 8 in an electronic device according to an embodiment of the present disclosure.

FIG. 8 is a diagram for explaining another operation procedure of processing voice recognition by dividing a voice recognition section in an electronic device according to an embodiment of the present disclosure, and FIG. 9 is a diagram shown for illustrating operations corresponding to FIG. 8.

In FIG. 8, an operation 801, an operation 803, an operation 805, and an operation 807 may be performed by including operations corresponding to the descriptions of the operation 401, the operation 403, the operation 405, and the operation 407, respectively, described with reference to FIG.

4. Therefore, in FIG. 8, descriptions for the operations corresponding to the above-described operations in FIG. 4 will be omitted.

Referring now to FIGS. 8 and 9, in operation 807, when determining that a direction of the speaker 500 and a beamforming direction 903 do not match each other according to the operation result of comparing the direction of the speaker 500 and the beamforming direction 903 of operation 805, the controller 180 may process the voice recognition section to operate in a non-directivity based recognition section (a beam formation section) in operation 809. For example, as illustrated in FIG. 9, the beamforming direction 903 of the electronic device 100 may be formed in an opposite direction to the user speaking 500. When it is determined that the beamforming direction 903 and the direction of the speaker 500 do not match each other, the controller 180 may process the voice recognition operation in the non-directivity based recognition section (a beam forming section) 909. According to one embodiment, when determining an operation in the non-directivity based recognition section 909, the controller 180 may process the voice recognition process with respect to a voice signal (for example, Hi 510) input through the microphone 143, before determining the non-directivity based recognition section 909 or during the non-directivity based recognition section 909.

In one embodiment of the present disclosure, the controller 180 may perform voice recognition by simultaneously applying non-directional and directional features during the non-directivity based recognition section 909 (for example, an early part of the voice recognition operation). At this time, the controller 180 may simultaneously apply non-directional and directional features, while applying a higher weight to the non-directional feature and applying a lower weight to the directional feature on the basis of a soft-decision technique during the non-directivity based recognition section 909 to perform a voice recognition process. For example, when assuming that the total weight is "100%", the voice recognition may be processed mainly on the non-directional feature by applying 90% of total weight to the non-directional feature and applying 10% of total weight to the directional feature during the non-directivity based recognition section 909. According to one embodiment, the controller 180 may grant (configure) a first weight (for example, 90%) to a non-directional input voice signal and a second weight (for example, 10%) lower than the first weight to a directional input voice signal during the directivity based recognition section 915 (for example, a non-directional weight (a first weight)>a directional weight (a second weight)) to apply the configuration to the voice recognition operation.

In operation 811, the controller 180 may configure (change) the beamforming direction 903 currently formed in the electronic device 100 so as to correspond to the direction of the speaker 500. For example, the controller 180 may rotate the beamforming direction 903 of the electronic device 100, as shown in FIG. 9, to the direction of the speaker 500.

In operation 813, the controller 180 may determine whether the voice non-directivity based recognition section 909 has ended. For example, the controller 180 may determine whether a predetermined time (for example, 0.3 seconds) required to form the beamforming direction 903 so as to correspond to the direction of the speaker 500 in the non-directivity recognition section 909 has expired (the rotation of the beamforming direction has been completed).

In operation 813, when determining that the non-directivity recognition section 909 has not ended ('No' in operation 813), the controller 180 may proceed to the operation 809 to perform the following operations.

In operation 813, when determining that the non-directivity recognition section 909 has ended ('Yes' in operation 813), the controller 180 may process the recognition section so as to operate as the directivity recognition section, in operation 815. For example, as described above in FIG. 9, the recognition section may be operated as a directivity based recognition section 915 after the non-directivity based recognition section 909, that is, from the time point at which the beamforming direction 903 corresponds to the direction of the speaker 500, and to process the voice recognition operation. According to one embodiment, when determining an operation in the directivity recognition section 915, the controller 180 may process the voice recognition with respect to a voice signal (for example, Galaxy 530) input through the microphone 143 in non-directional 905 and directional 903.

In one embodiment of the present disclosure, the controller 180 may perform voice recognition by simultaneously applying the non-directional and directional features during the directivity based recognition section 915 (for example, a middle/later part of voice recognition operation). At this time, the controller 180 may simultaneously apply non-directional and directional features, while applying a higher weight to the directional feature and applying a lower weight to the non-directional feature on the basis of a soft-decision technique during the directivity based recognition section 915 to perform a voice recognition process. For example, when assuming that the total weight is "100%", the voice recognition may be processed mainly on the directional feature by applying 20% of total weight to the non-directional feature and applying 80% of total weight to the directional feature during the directivity based recognition section 915. According to one embodiment, the controller 180 may grant (configure) a third weight (for example, 20%) to a non-directional input voice signal and a fourth weight (for example, 80%) higher than the third weight to a directional input voice signal during the directivity based recognition section 915 (for example, a non-directional weight (a third weight)<a directional weight (a fourth weighting)) to apply the configuration to the voice recognition operation.

In an embodiment of the present disclosure, the first weight to the fourth weight may be configured in advance from experimental results or the like performed in advance, and can be variously changed and configured according to the user. In addition, the examples of the first weight to the fourth weight are illustrated for convenience of illustration, and may be implemented in various ways on the basis of various differential ratios. When configuring the ratios differently from each other, a higher weight can be set to the non-directivity in the non-directivity based recognition section 909 and a higher weight can be set to the directivity in the directivity based recognition section 915.

According to an embodiment of the present disclosure, as the examples of FIGS. 8 and 9, the total voice recognition section according to the voice recognition may be divided into the non-directivity based recognition section 909 and the directivity based recognition section 915, and the voice recognition operation may be processed according to the non-directional feature and the directional feature in the total voice recognition section while differentially applying a weight of the voice recognition ratio. For example, the total voice recognition section may be divided into the non-directivity based recognition section 909 which processes the voice recognition by assigning a higher weight to the non-directional feature in an early part of the voice recognition operation, and the directivity based recognition section 915 which processes the voice recognition operation by assigning a higher weight to the directional feature in the middle/later part of the voice recognition operation in which the beamforming direction 903 is formed so as to correspond to the direction of the speaker 500. Thus, an embodiment of the present disclosure may allow performance voice recognition by simultaneously receiving voice signals non-directionally and directionally for each section of the divided voice recognition sections, while performing a suitable different voice recognition operation for each section by assigning different weights to correspond to each section based on the soft-decision technique, thereby increasing a voice recognition rate.

As described above, the electronic device 100 according to an embodiment of the present disclosure may divide the voice recognition section using various methods (for example, a beam formation section and a recognition section) when providing a voice recognition function of applying beamforming, and differently process the voice recognition operation for each of the divided recognition sections to thereby improve the voice recognition rate. Hereinafter, there will be described an example of generating training data by training the voice processed by the voice recognition of applying the beamforming and further improving the voice recognition rate using the training data, according to an embodiment of the present disclosure.

Figure 10:
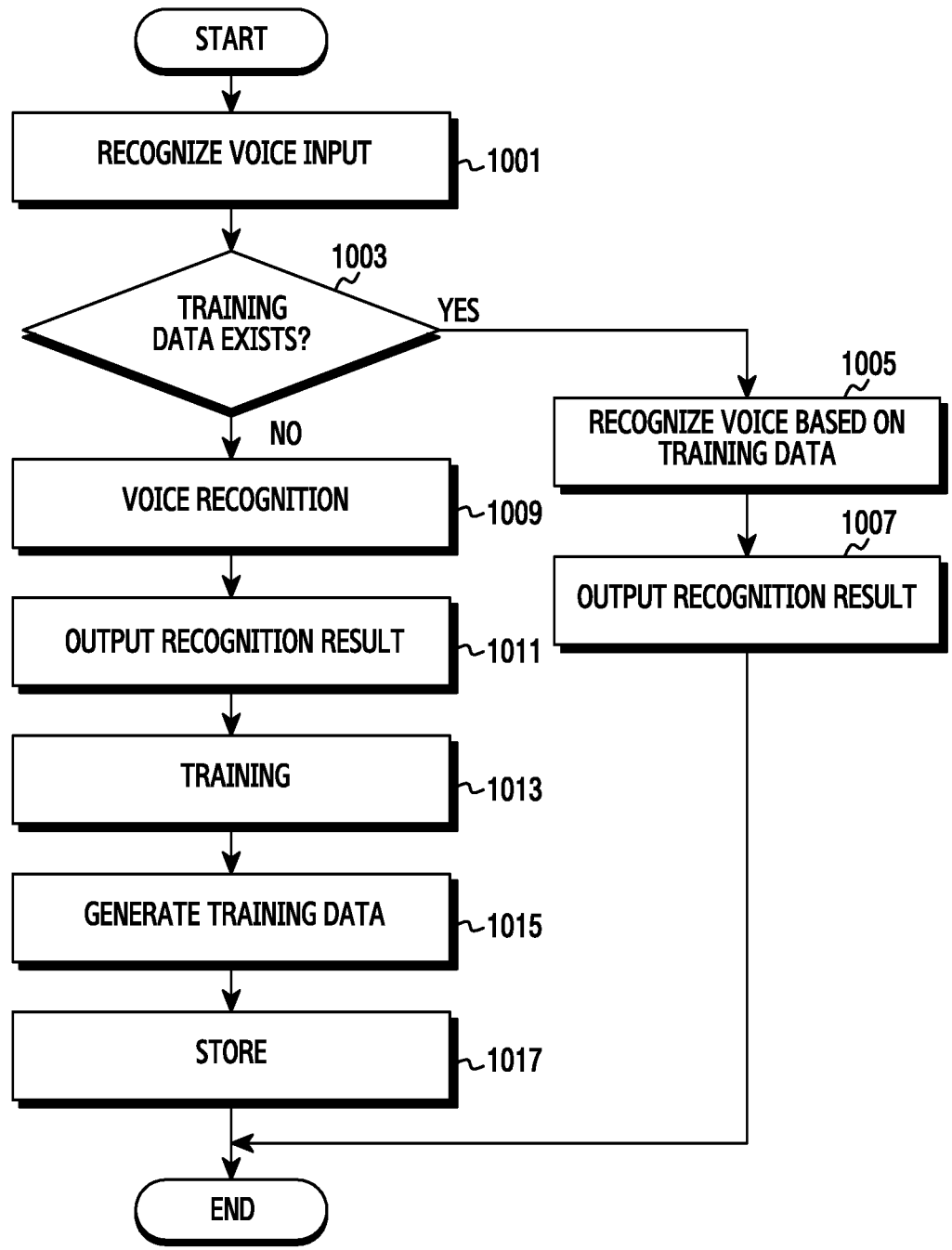
FIG. 10 is a flowchart illustrating an operational procedure for processing voice recognition, based on training data, with respect to a voice input through beamforming in an electronic device according to an embodiment of the present disclosure.

FIG. 10 is a flowchart illustrating an operation procedure for processing voice recognition based on training data with respect to a voice input through beamforming by an electronic device according to an embodiment of the present disclosure.

Referring to FIG. 10, in operation 1001, the controller 180 may recognize the voice input through the microphone 143 by beamforming. In the preferred embodiment, when the voice of the speaker is input from the microphone 143, the controller 180 may perform a pre-processing procedure on the input voice and extract a feature from the pre-processed voice signal.

In operation 1003, the controller 180 may determine whether the pre-trained training data exists or not. In an embodiment of the present disclosure, the training data corresponds to data which is modeled in advance through the training of the previously voice recognized voice signal or may be data previously provided by a provider of an electronic device 100. In the embodiment of the present disclosure, the training data may be stored in at least one of an electronic device 100 and an external device (for example, another electronic device or a server). In an embodiment of the present disclosure, the training data may have the form of isolated words, connected words, continuous voice, large/small-capacity vocabulary, and the like.

In the operation 1003, when determining that there is training data ("Yes" in operation 1003), the controller 180 may process the voice recognition operation based on the training data in operation 1005. In an embodiment of the present disclosure, the voice recognition operation may be performed in a sequential, parallel, repetitive or heuristic method. For example, the controller 180 may compare the feature extracted from the input voice signal and the training data, and trace and obtain the most similar data from the training data. According to one embodiment, the controller 180 may store various pieces of training data inside or outside thereof, and compare the input voice signal to be recognized with the training data. The controller 180 may determine (select) the most similar training data based on the comparison operation, and derive the recognition result that what the input voice signal means based on the determined training data. In an embodiment of the present disclosure, the controller 180 may determine (select) training data corresponding to an input voice based on a template matching technique which extracts a template (training data) which matches with a given voice and or a pattern matching technique.

In operation 1005, the controller 180 may output the recognition result according to the voice recognition operation. For example, the controller 180 may output a command, or text corresponding to the recognition result, and process an operation (or function) corresponding to the command or text.

In the operation 1003, when determining that there is no training data ("No" in operation 1003), the controller may process the voice recognition operation based on the input voice signal in operation 1009, and output the recognition result according to the voice recognition operation in operation 1011.

In operation 1013, the controller 180 may perform the training based on the input voice signal, and generate the training data based on the training in operation 1015. In an embodiment of the present disclosure, the controller 180 may train the electronic device 100 so as to perform any action (operation) on the basis of the voice input being applied with beamforming. In an embodiment of the present disclosure, an operation of generating the training data according to the training may be carried out by using a template matching method, a pattern matching method, a statistical pattern matching technique, a training matching method, or the like. For example, the training data may be generated by various techniques which can model most similarly to the speaker's voice and maximize the performance.

In operation 1015, the controller 180 may store the training data. In an embodiment of the present disclosure, the training data may be stored in the storage unit 150 of the electronic device 100, and alternatively or additionally stored in different external devices (for example, another electronic device, a server, etc.) functionally connected to the electronic device 100.

Meanwhile, in FIG. 10, it has been described that, in the operation 1003, if the training data does not exist, the voice recognition operation is pre-performed (for example, an operation 1009, and an operation 1011), and training data generation operations (such as operation 1013, an operation 1015, and operation 1017) are performed later. However, the operations of the present disclosure are not limited to the order thereof, the voice recognition operation and the training data generation operation may be performed in parallel, or the training data generation operation may be pre-performed and then the voice recognition operation may be performed later.

Thus, an embodiment of the present disclosure enables training using the voice input by beamforming, and processes the voice recognition based on training data obtained through the training, thereby increasing the voice recognition rate of the voice input by beamforming.

Figure 11:
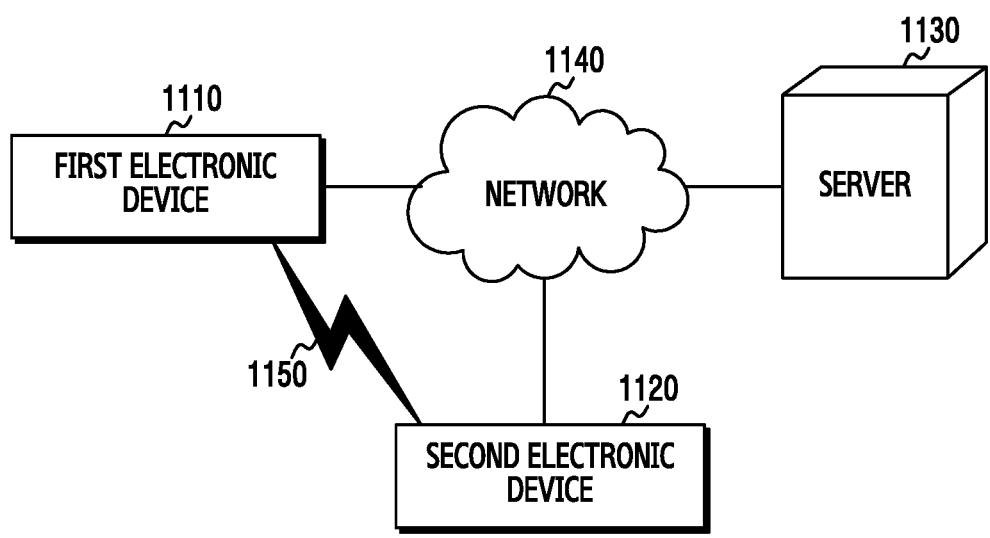
FIG. 11 is a diagram for explaining an operation of managing training data by an electronic device according to an embodiment of the present disclosure.

FIG. 11 is a diagram for explaining an operation of managing training data by an electronic device according to an embodiment of the present disclosure.

Referring to FIG. 11, a first electronic device 1110 and a second electronic device 1120 are the same or different kinds of device from the electronic device 100 described above. A server 1130 may include a group of one or more servers.

According to an embodiment of the disclosure, training data generated by one of the electronic devices (for example, the first electronic device 1110) may be continuously or periodically updated to another electronic device (for example, a second electronic device 1120) or a server 1130. For example, the electronic device (for example, the first electronic device 1110) may train the voice input through the beamforming in order to be optimized for the user who uses the first electronic device 1110, and store the training data according to the training in at least one of the first electronic device 1110, the second electronic device 1120, or the server 1130.

According to one embodiment, the first electronic device 1110 may configure communication between external devices (for example, the second electronic device 1120 and the server 1130) over a communication interface, and store the training data in another external device using the configured communication. The communication interface may be connected to a network 1140 via a wireless or wired communication to transmit or receive the training data by communicating with the second electronic device 1120 or the server 1130.

The network 1140 may include at least one of communication networks such as a computer network (for example, a LAN or a WAN), the Internet, and a telephone network.

The wireless communication may use at least one of, for example, a protocol such as Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS).

In addition, the wireless communication may include, for example, short-range communication 1150. The short-range communication 1150 may include at least one of, for example, Wi-Fi, Bluetooth, Near Field Communication (NFC), and Global Positioning System (GPS).

On the other hand, all or a part of the operations performed in the electronic device 100 according to an embodiment of the present disclosure may be performed in another electronic device or a plurality of electronic devices (for example, the first electronic device 1110, the second electronic device 1120, and the server 1130). According to an embodiment, when the electronic device 100 should perform some functions (for example, a voice recognition function) automatically or by a request, the electronic device 100 may request the external device (for example, the electronic device 1110 or 1120, or the server 1130) for performing at least some functions related to the functions, instead of performing the functions by itself or additionally. The external device (for example, the electronic devices 1110 and 1120, or the server 1130) may perform a function requested or added by the electronic device 100, and transmit the result to the electronic device 100. The electronic device 100 may process the received result as it is or additionally to provide the requested function.

An electronic device and a method for operating the same according to an embodiment of the present disclosure may prevent in advance a voice recognition error due to a voice input during a predetermined time taken to change the beamforming direction in response to the direction of the speaker in the voice recognition to which beamforming is applied, and thus improving the voice recognition rate.

According to an embodiment of the present disclosure, a voice recognition section can be divided into a first section having the beamforming direction changed therein and a second section after which the beamforming direction is changed to the direction of the speaker (after the beam is formed), and different types of voice recognition can be processed by dividing a voice input in the first section and a voice input in the second section. Thus, an embodiment of the present disclosure may prevent the deterioration of the voice recognition rate while changing the beamforming direction, and as a result, improve the accuracy of voice recognition.

In addition, an embodiment of the present disclosure may perform the training for the voice input to which beamforming is applied, and add the learned training data (model) to a voice recognition procedure, so as to improve the accuracy of voice recognition.

According to various embodiments of the present disclosure, an optimum environment for improving the voice recognition rate of the voice recognition function in an electronic device can be implemented, by which the user's convenience is improved and it can contribute to the improvement of the usability, accessibility and competitiveness of the electronic device.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device that performs voice recognition, comprising:
    a microphone configured to receives an input of a voice and generates a voice signal;
    a non-transitory storage unit configured to stores data processed based on voice recognition; and
    a processor functionally connected to the microphone and the storage unit, wherein the processor is configured to:
    detect an input of the voice signal through the microphone,
    determine a direction of a speaker based on the voice signal,
    determine a beamforming direction of the microphone based on the direction of the speaker,
    determine whether the direction of the speaker corresponds to the beamforming direction,
    if the direction of the speaker corresponds to the beamforming direction, perform a voice recognition about the voice signal,
    if the direction of the speaker does not corresponds to the beamforming direction, divide a voice recognition section for the voice recognition into a first section and a second section based on a predefined dividing method,
    process a voice recognition operation based on a first method for a first voice signal inputted during the first section, and
    process the voice recognition operation based on a second method for a second voice signal inputted during the second section.

2. The electronic device of claim 1,
    wherein the first section that includes a section from a time of detecting the voice signal to a predetermined time required for a formation the beamforming direction corresponding to the direction of the speaker, and
    wherein the second section that includes a section from after the first section to the end of the voice recognition operation.

3. The electronic device of claim 2, wherein the processor is configured to:
    determine of the direction of the speaker and the beamforming direction when initiating the voice recognition, and
    control to change the beamforming direction based on a result of the determining.

4. The electronic device of claim 1, wherein the processor is configured to:
    omit a voice recognition process for the first voice signal during the first section, and
    perform a voice recognition process for the second voice signal during the second section.

5. The electronic device of claim 1, wherein the processor is configured to:
    perform the voice recognition operation for the first voice signal inputted by a non-directional during the first section, and
    perform the voice recognition operation for the second voice signal inputted by a directional during the second section.

6. The electronic device of claim 1, wherein the processor is configured to:
    performs the voice recognition operation for voice signals simultaneously inputted by non-directionally and directionally during the first section and the second section, and
    wherein the processor is further configured to:
    process the voice recognition operation by setting a higher weight to the non-directionally inputted voice signal than the directionally inputted voice signal in the first section, and
    process the voice recognition operation by setting a second higher weight to the directionally inputted voice signal than the non-directionally inputted voice signal in the second section.

7. The electronic device of claim 1, wherein the processor is configured to:
    performs training based on the voice signal inputted during an operation preceding the voice recognition, and generates training data based on the training.

8. The electronic device of claim 7, wherein the training data is stored in one or more of the storage unit, another electronic device, or a server.

9. The electronic device of claim 8, wherein the processor is configured to process voice recognition for an input voice signal based on the training data.

10. The electronic device of claim 1, wherein the processor comprises a voice recognition unit which performs different types of voice recognition for each of the divided sections with respect to the input voice.

11. The electronic device of claim 10, wherein the voice recognition unit comprises:
    a direction detection module that detects a direction of the speaker;
    a beam-former that changes a beamforming direction to correspond to the direction of the speaker detected by the direction detection module;
    a decoder that provides a recognition result based on the voice signal or, based on the voice signal and a pre-learned training data;
    at least one training module that performs training for the training data based on a voice signal passed from the decoder;
    at least one modeling module that generates the training data based on the training of the training module; and
    an output module that outputs a recognition result corresponding to the input voice.

12. A method for recognizing a voice by an electronic device, comprising:
    detecting an input of a voice signal;
    determining a direction of a speaker based on the voice signal;
    determining a beamforming direction of a microphone based on the direction of the speaker;
    determining whether the direction of the speaker corresponds to the beamforming direction;

if the direction of the speaker corresponds to the beamforming direction, performing a voice recognition about the voice signal;

if the direction of the speaker does not corresponds to the beamforming direction, dividing a voice recognition section for the voice recognition into a first section and a second section based on a predefined dividing method;

processing a voice recognition operation based on a first method for a first voice signal inputted during the first section; and processing the voice recognition operation based on a second method for a second voice signal inputted during the second section.

13. The method of claim 12, wherein the first section that includes a section from a time of detecting the voice signal to a predetermined time required for a formation the beamforming direction corresponding to the direction of the speaker, and wherein the second section that includes a section from after the first section to the end of the voice recognition operation.

14. The method of claim 12, wherein the processing of the voice recognition operation comprises:

omitting a voice recognition process for the first voice signal during the first section; and performing a voice recognition process for the second voice signal during the second section.

15. The method of claim 12, wherein the processing of the voice recognition operation comprises:

performing the voice recognition operation for the first voice signal inputted by non-directional during the first section, and performing the voice recognition operation for the second voice signal inputted by directional during the second section.

16. The method of claim 12, wherein the processing of the voice recognition operation comprises:

performing the voice recognition operation for voice signals simultaneously inputted by non-directionally and directionally during the first section and the second section; and wherein the performing of the voice recognition operation for voice signals comprise:

processing the voice recognition operation by setting a higher weight to the non-directionally inputted voice signal than the directionally inputted voice signal in the first section, and processing the voice recognition operation by setting a higher weight to the directionally inputted voice signal than the non-directionally inputted voice signal in the second section.

17. The method of claim 12, further comprising:

performing training based on a voice signal inputted during an operation of performing the voice recognition, and generating training data based on the training; and storing the training data in at least one of inside or outside of the electronic device.

18. The method of claim 17, wherein performing the voice recognition operation comprises: processing voice recognition for the voice signal based on the training data.

19. The method of claim 12, further comprising:

if the direction of the speaker does not corresponds to the beamforming direction, changing the beamforming direction during the first section.

20. A non-transitory computer-readable recording medium in which a program for executing operations is recorded, when executed by a processor the operations comprising:

detecting an input of a voice signal;

determining a direction of a speaker based on the voice signal;

determining a beamforming direction of a microphone based on the direction of the speaker;

determining whether the direction of the speaker corresponds to the beamforming direction;

if the direction of the speaker corresponds to the beamforming direction, performing a voice recognition about the voice signal;

if the direction of the speaker does not corresponds to the beamforming direction, dividing a voice recognition section for the voice recognition into a first section and a second section based on a predefined dividing method;

processing a voice recognition operation based on a first method for a first voice signal inputted during the first section; and processing the voice recognition operation based on a second method for a second voice signal inputted during the second section.

\* \* \* \* \*